United States Patent
Cagan et al.

(10) Patent No.: US 11,899,669 B2
(45) Date of Patent: Feb. 13, 2024

(54) SEARCHING OF DATA STRUCTURES IN PRE-PROCESSING DATA FOR A MACHINE LEARNING CLASSIFIER

(71) Applicant: Carnegie Mellon University, Pittsburgh, PA (US)

(72) Inventors: Jonathan Cagan, Pittsburgh, PA (US); Phil LeDuc, Pittsburgh, PA (US); Mark Whiting, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1028 days.

(21) Appl. No.: 15/926,790

(22) Filed: Mar. 20, 2018

(65) Prior Publication Data

US 2018/0276278 A1    Sep. 27, 2018

Related U.S. Application Data

(60) Provisional application No. 62/601,370, filed on Mar. 20, 2017.

(51) Int. Cl.
*G06N 20/00*      (2019.01)
*G06F 16/2455*    (2019.01)
*G06N 5/046*      (2023.01)
*G06F 16/901*     (2019.01)
*G06F 16/36*      (2019.01)

(52) U.S. Cl.
CPC ...... *G06F 16/24564* (2019.01); *G06F 16/367* (2019.01); *G06F 16/9024* (2019.01); *G06N 5/046* (2013.01); *G06N 20/00* (2019.01)

(58) Field of Classification Search
CPC ............ G06F 16/24564; G06F 16/367; G06F 16/9024; G06N 20/00; G06N 5/046
See application file for complete search history.

(56) References Cited

U.S. PATENT DOCUMENTS

| | | | | |
|---|---|---|---|---|
| 5,467,459 A | * | 11/1995 | Alexander | G06F 15/8015 711/202 |
| 8,527,435 B1 | * | 9/2013 | Han | G06N 20/10 600/509 |
| 2013/0172043 A1 | * | 7/2013 | Garg | H04W 24/02 455/524 |

OTHER PUBLICATIONS

García, S., Ramírez-Gallego, S., Luengo, J., Benítez, J., & Herrera, F. (2016). Big data preprocessing: methods and prospects. Big Data Analytics, 1(1), 1-22. (Year: 2016).*

(Continued)

*Primary Examiner* — Kamran Afshar
*Assistant Examiner* — Marshall L Werner
(74) *Attorney, Agent, or Firm* — Fish & Richardson P.C.

(57) ABSTRACT

A data processing system is configured to pre-process data for a machine learning classifier. The data processing system includes an input port that receives one or more data items, an extraction engine that extracts a plurality of data signatures and structure data, a logical rule set generation engine configured to generate a data structure, select a particular data signature of the data structure, identify each instance of the particular data signature in the data structure, segment the data structure around instances of the particular data signature, identify one or more sequences of data signatures connected to the particular data signature, and generate a logical ruleset. A classification engine executes one or more classifiers against the logical ruleset to classify the one or more data items received by the input port.

29 Claims, 12 Drawing Sheets

(56) References Cited

OTHER PUBLICATIONS

Uchida S. "Image processing and recognition for biological images." Dev Growth Differ. May 2013;55(4):523-49. (Year: 2013).*

Akgul CB, Rubin DL, Napel S, Beaulieu CF, Greenspan H, Acar,B (2011) "Content-based image retrieval in radiology: current status and future directions." Journal of Digital Imaging, 24(2): pp. 208-222 (Year: 2011).*

Garcfa, S., Ramfrez-Gallego, S., Luengo, J., Benftez, J., & Herrera, F. (2016). Big data preprocessing: methods and prospects. Big Data Analytics, 1(1), 1-22. (Year: 2016).*

E.-H. S. Han and G. Karypis. Centroid-based document classification: Analysis and experimental results. In Proceedings of the Spoken Language Technology Workshop (SL T), pp. 165-169, Miami, FL. 2012. (Year: 2012).*

K. Shin, A. Abraham, and S. Han. Enhanced centroid-based classification technique by filtering outliers. In Text, Speech and Dialogue, Lecture Notes in Computer Science, pp. 159-163. Springer, 2006. (Year: 2006).*

Korde, V .; Mahender, C.N. Text classification and classifiers: A survey. International Journal of Artificial Intelligence Applications (IJAIA), vol. 3, No. 2, Mar. 2012. (Year: 2012).*

R.H. Leary, J.B. Rosen, and P. Jambeck, "An Optimal Structure-Discrminative Amino Acid Index for Protein Recognition," Biophysical J., vol. 86, pp. 411-419, 2004 (Year: 2004).*

Q. Zhao and S. Bhowmick, "Sequential Pattern Mining: A Survey," Technical Report CAIS, Nayang Technological Univ.,pp. 1-26, 2003. (Year: 2003).*

James Tilton, Yuliya Tarabalka, Paul Montesano, Emanuel Gofman. Best Merge Region-Growing Segmentation with Intergrated Nonadjacent Region Object Aggregation. IEEE Transactions on Geoscience and Remote Sensing, Institute of Electrical and Electronics Engineers, 2012, 50 (11), pp. 4454-4467 (Year: 2012).*

Yan, X. and Han, J. 2002. gSpan: Graph-based substructure pattern mining. In IEEE International Conference on Data Mining. IEEE Computer Society Press, Los Alamitos, CA (Year: 2002).*

L.Graening, B.Sendhoff, Shape mining: A holistic data mining approach for engineering design, Adv. Eng. Inform.28(2) (2014) 166-185. (Year: 2014).*

Gulordava, Kristina and Paola Merlo. 2015a. Diachronic trends in word order freedom and dependency length in dependency-annotated corpora of latin and ancient greek. In Proceedings of the International Conference on Dependency Linguistics (Depling'15), Uppsala, Sweden, Aug. 2015.*

Chakrabarti D., Faloutsos C., Graph mining: Laws, generators.and algorithms, ACM Computing Surveys (CSUR), 2006, 38(1), 2 (Year: 2006).*

Fiorentini, X. , Gambino, I. , Liang, V. , Foufou, S. , Rachuri, S. , Mani, M. and Bock, C. (2007), An Ontology for Assembly Representation, NIST Interagency/Internal Report (NISTIR), National Institute of Standards and Technology, Gaithersburg, MD (Year: 2007).*

Fan Zhang, Yang Song, Weidong Cai, Alexander G. Hauptmann, Sidong Liu, Sonia Pujol, Ron Kikinis, Michael J. Fulham, David Dagan Feng, Mei Chen, Dictionary pruning with visual word significance for medical image retrieval, Neurocomputing, vol. 177, 2016, pp. 75-88. (Year: 2016).*

Shirley H. Lee, Gregory W. Donohoe, Michael J. Wilcox, "Identifying retinal vessel networks in ocularfundus images," Proc. SPIE 1964, Applications of Artificial Intelligence 1993: Machine Vision and Robotics, (Mar. 11, 1993) (Year: 1993).*

Lee et al., Identifying Retinal Vessel Networks in Ocular Fundus Images, Proc. SPIE 1964, Applications of Artificial Intelligence 1993: Machine Vision and Robotics, Mar. 1993. (Year: 1993).*

Schmidt et al., GGREADA: A Graph Grammar-Based Machine Design Algorithm, Research in Engineering Design (1997) 9:195-213, 1997. (Year: 1997).*

Zhao et al., Sequential Pattern Mining: A Survey, Technical Report CAIS, pp. 1-26, 2003. (Year: 2003).*

Shin et al., Enhanced Centroid-Based Classification Technique by Filtering Outliers, pp. 159-163, 2006. (Year: 2006).*

Chakrabarti et al., Graph mining: Laws, Generators and Algorithms, ACM Computing Surveys (CSUR), 38(1), 2006. (Year: 2006).*

Han et al., Centroid-Based Document Classification: Analysis and Experimental Results, Proceedings of the Spoken Language Technology Workshop, pp. 165-169, 2012. (Year: 2012).*

Korde et al., Text Classification and Classifiers: A survey, International Journal of Artificial Intelligence Applications (IJAIA), vol. 3, No. 2, Mar. 2012. (Year: 2012).*

Tilton et al., Best Merge Region-Growing Segmentation with Integrated Nonadjacent Region Object Aggregation, IEEE Transactions on Geoscience and Remote Sensing, 50 (11), pp. 4454-4467, 2012. (Year: 2012).*

Rousseau et al., Text Categorization as a Graph Classification Problem, Proceedings of the 53rd Annual Meeting of the Association for Computational Linguistics and the 7th International Joint Conference on Natural Language Processing, pp. 1702-1712, Jul. 2015. (Year: 2015).*

Zhang et al., Dictionary Pruning with Visual Word Significance for Medical Image Retrieval, Neurocomputing, vol. 177, pp. 75-88, 2016. (Year: 2016).*

Ogiela et al., Graph Image Language Techniques Supporting Radiological Hand Image Interpretations, Computer Vision and Image Understanding 103 (2006) pp. 112-120, 2006. (Year: 2006).*

Teboul et al., Segmentation of Building Facades Using Procedural Shape Priors, 2010. (Year: 2010).*

\* cited by examiner

| Grammar Induction Example | | |
|---|---|---|
| Data Type | Text | Building Plan |
| Raw Input | ...This is a sample English sentence.... |  |
| Step 1. Extracting Objects | {This, is, a, sample, English, sentence, .} |  |
| Step 2. Forming Structures | [This] → [This, is]<br>[is] → [is, a] |  |
| Step 3. Expanding Rules | [This] → [This, is, a] |  |
| Step 4. Inter-Rule Relationships | [This] → [This, is, a, (insert object rule)] |  |
| Sample Output | This is a sample sentence. |  |

SEARCHING OF DATA STRUCTURES IN PRE-PROCESSING DATA FOR A MACHINE LEARNING CLASSIFIER

CLAIM OF PRIORITY

This application claims priority under 35 U.S.C. § 119(e) to U.S. Patent Application Ser. No. 62/601,370, filed on Mar. 20, 2017, the entire contents of which are hereby incorporated by reference.

TECHNICAL FIELD

The techniques described herein relate to searching of data structures in preprocessing data for a machine learning classifier.

BACKGROUND

Classifying minor ontological differences within complex networks is challenging because the nature of the graph is not naively extracted. Traditional machine learning based classification is effective if ontological relationships are well understood, or if a standardized representation can be established, but without such a process, these methods require more data than many applications can offer (e.g., in medical scans and design analysis data). By using a grammar representation preprocess, traditional machine learning techniques show more promise.

SUMMARY

Grammars are a proven tool for the representation, generation, and analysis of design, however, difficulty in producing grammars has hindered their widespread adoption outside of academia. The key challenges of using shape grammars—generation, parsing, and inference—have been partially addressed by literature over the past 20 years, but the first generation through an interpreter, remains largely unsolved for design grammars. A foremost challenge of automatically inducting grammars from a suitable dataset is that this process is of combinatorial complexity and thus takes impractically long. Intuitively, forming a graph grammar is a process of breaking a target graph down into a manageable set of morphological rules. To simply reproduce a graph is easily feasible, but to do so while maintaining subtlety of style or meaning is difficult and to do it provably optimally requires considering every plausible rule and determining which minimal set demonstrates the grammar best, which makes it computationally intensive.

Language translation is limited by many of the same challenges as developing grammars for design. However, due to the comparative linearity of language models, approaches for learning lingual grammars have existed for some time. The modern approach to machine translation involves extracting a grammar and lexicon for both the starting and final languages and constructing a transform from one to the other. For example, when a sentence is translated from one language to another, grammatical models are used to improve translation quality significantly. Services that provide translation features use a number of other machine learning techniques to reduce errors and improve the speed of computation for this process, but in essence, the practice of building a grammar and executing it is a quintessential step in effective translation. As a result, there are various mechanisms for inducting lingual grammars and ontologies that have been made efficient enough for practical use through years of refinement by industry players. For example, many popular translation tools use language models that are constantly updated based on popular usage to improve accuracy and efficiency around new uses of language and jargon. Additionally, advanced methods of chunking have been developed to improve the performance of such systems.

Learning from these advances in machine translation and their applications to design, this paper introduces a means for efficiently inducing grammars for design by using a probabilistic chunking method paired with a multi scale random walk based graph exploration approach to accommodate the complexities required in inducing design representations. The probabilistic approach does not reduce computational efficiency in the worst case, a random graph, but drastically reduces it in most cases likely to be assessed with grammars because chunk recognition can be done at a rate that is significantly faster than exhaustive searches, and the random walk allows for many discrete explorations of the graph without a time intensive exhaustive search in most cases. This process produces grammars that are well suited for classification and other computational analysis that may be convenient for specific applications.

To evaluate the success of the introduced method, experiments were conducted assessing four key attributes of a range of types of graphs: accuracy, variability, repeatability and conciseness. The experiments utilized several datasets including, rule based unidimensional graphs, rule-based multidimensional graphs, historic buildings with well-established hand-made shape grammar representations, and a greenhouse design with component wise specificity. Rule based graphs were used to demonstrate basic effectiveness, while real world examples demonstrate specific applications of the induction method as well as alignment with human based grammar induction results. Further analysis of feature classification, and learning statistics will be reported in a forthcoming publication.

The configuration of the data processing system enables classification of a data item with little training data. Compared to statistical machine learning processes, far less training data (e.g., <10 data items) can be used to train the classifier to reliably classify data items. Using less training data by generating the logical ruleset enables the data processing system to increase a processing speed compared to a data processing system that does not generate the logical ruleset. The data processing system can classify data items that might not be classifiable with statistically reliant machine learning approaches, such as neural networks, support vector machines, etc. that require a wealth of training data (100s of training data items) to reliable classify a data item. Using less data requires less processing, fewer iterations of training, and faster classification of data items.

This document describes a data processing system configured to pre-process data for a machine learning classifier. The data processing system includes an input port that receives one or more data items; a shared memory data store that stores the one or more data items, with each of the one or more data items being written to the shared memory data store; an extraction engine that extracts, from a data item of the one or more data items written to the shared memory data store, a plurality of data signatures and structure data representing relationships among the data signatures; a logical rule set generation engine configured to perform operations including: generating a data structure from the plurality of data signatures, where the data structure includes a plurality of nodes connected with edges, each node in the data structure represents a data signature, and where each edge specifies a relationship between a first node and a second node, with the specified relationship corresponding to a relationship represented in the structure data for data signatures represented by those first and second nodes; selecting a particular data signature of the data structure; for the particular data signature of the data structure that is selected, identifying each instance of the particular data signature in the data structure; segmenting the data structure around instances of the particular data signature; and identifying, based on the segmenting, one or more sequences of data signatures connected to the particular data signature, each of the one or more sequences being different from one or more other identified sequences of data signatures connected to the particular data signature in the data structure; generating a logical ruleset, where each logical rule of the logical ruleset is defined by a sequence of data signatures of the one or more sequences of data signatures that are identified; and a classification engine that receives the logical ruleset as an input and executes one or more classifiers against the logical ruleset to classify the one or more data items received by the input port, where one or more additional logical rules for the logical ruleset are generated based on the executing. The function of the preamble is to set forth the general technical environment of the invention.

In some implementations, generation of the logical ruleset enables classification of the one or more data items with a reduced amount of data, relative to an amount of data required to classify the one or more data items independent of the generation of the logical ruleset. In some implementations, classification of the one or more data items with a reduced amount of data increases a processing speed of the data processing system in classifying the one or more data items, relative to a processing speed of the data processing system in classifying the one or more data items independent of the generation of the logical ruleset.

In some implementations, the classification engine is configured to determine a frequency for which each logical rule of the logical ruleset appears in the data structure; and generate a vector representing the data item, the vector defined by the frequency for each logical rule of the logical ruleset. In some implementations, the classification engine is configured to compare the vector with another vector generated for another data item of the one or more data items, where comparing includes computing a distance between the vector and the other vector in a vector space. In some implementations, the classification engine is configured to determine which logical rules of the logical ruleset occur in another data item of the one or more data items; and represent the other data item as a vector of the logical rules that occur in the other data item.

In some implementations, the logical rule set generation engine is configured to rank the plurality of data signatures; and select a higher ranked data signature to be the particular data signature. In some implementations, data signatures above a threshold ranking are iteratively selected to be the particular data signature, and where the logical ruleset comprises logical rules generated for each of the data signatures selected to be the particular data signature. The ranking for a data signature is proportional to a frequency in which that data signature appears in the plurality of data signatures.

In some implementations, the logical rule set generation engine is configured to weight a data signature with a predetermined weight value, and where ranking is based on the predetermined weight value of the data signature. In some implementations, the logical rule set generation engine is configured to determine, for a logical rule, a frequency for which a sequence that defines the logical rule appears in the data structure; determine that frequency is less than a threshold frequency; and remove the logical rule from the logical ruleset.

In some implementations, the one or more sequences comprise a plurality of sequences. In some implementations, the logical rule set generation engine is configured to determine that a first sequence of the plurality of sequences includes a second sequence of the plurality of sequences, and remove, from the logical ruleset, a logical rule defined by the first sequence.

In some implementations, the extraction engine is configured to compare a portion of the data item to a library of specified data signatures, and where a data signature is extracted from the data item when the portion of the data item matches a specified data signature of the library. In some implementations, a specified data signature of the library is assigned one or more parameter values, and where the extraction engine extracts the data signature from the data item when the portion of the data item satisfies the one or more parameter values assigned to the data signature.

In some implementations, the logical rule set generation is configured to receive data indicating a threshold number of sequences; determine that a number of identified sequences for the data signature exceeds the threshold number of sequences; segment the data signature into sub-data signatures that each comprise at least one feature of the data signature; and generate another logical ruleset for at least one of the sub-data signatures, the other logical ruleset replacing the logical ruleset for the data signature.

In some implementations, the one or more sequences comprise a plurality of sequences, where the logical rule set generation engine is configured to determine that at least two sequences of the plurality are within a threshold similarity to one another; and combine at least two logical rules of the logical rule set, each of the least two logical rules corresponding to one of the at least two sequences of the plurality.

In some implementations, the data item comprises a graph, where extracting comprises performing a traversal of the graph, and where a logical rule of the logical ruleset comprises a graph rule of the graph. In some implementations, the data item comprises one or more graphical elements, where a data signature comprises a shape, and where a logical rule of the logical ruleset comprises a shape rule. In some implementations, the data item comprises an image, where extracting comprises performing an image processing process on the image, and where at least one of the plurality of data signatures comprises a visual feature of the image. In some implementations, the data item comprises text, where at least one of the plurality of data signatures comprises a word of the text, and where the structure data comprises one or more of a word order and word distance between two words of the text. In some implementations, the data item comprises a social graph, where a data signature of the plurality comprises a node of the social graph, and where the structure data comprises one or more edges of the social graph. In some implementations, the data item comprises a schematic, where a data signature comprises a machine part, and where the structure data comprises enumerated relationships between the machine parts.

In some implementations, the data processing system includes an input port that receives one or more radiological images; a shared memory data store that stores the one or more radiological images, with each of the one or more radiological images being written to the shared memory data store; an extraction engine that extracts image data representing a biological structure by image processing one of the one or more radiological images; a logical rule set generation engine configured to identify one or more portions of the biological structure, each having a biological signature based on comparing the biological structure to a library of specified biological signatures; generate a data structure from the biological structure, where the data structure includes a plurality of nodes connected with edges, each node in the data structure represents one of the biological signatures, and where each edge specifies a relationship between a first node and a second node; select a particular biological signature of the biological structure in the data structure; for the particular biological signature that is selected, identify each instance of the particular biological signature in the data structure; segment the data structure around instances of the particular biological signature; and identify, based on the segmenting, one or more sequences of biological signatures connected to the particular biological signature in the data structure, each of the one or more sequences identified being different from other identified sequences of biological signatures connected to the particular biological signature in the data structure; and generate a logical ruleset, where each logical rule of the logical ruleset is a sequence of biological signatures of the one or more sequences of biological signatures that are identified; and a classification engine that receives the logical ruleset as an input and executes one or more classifiers against the logical ruleset to classify the one or more radiological images received by the input port, where one or more additional logical rules for the logical ruleset are generated based on the executing.

In some implementations, the classification engine is configured to determine a frequency for which each logical rule of the logical ruleset appears in the data structure; and generate a vector representing the radiological image, the vector defined by the frequency for each logical rule of the logical ruleset. In some implementations, the classification engine is configured to: compare the vector with another vector generated for another radiological image of the one or more radiological images, where comparing includes computing a distance between the vector and the other vector in a vector space; and determine whether the vector is indicative of one or more biological anomalies based on the classifier.

In some implementations, the biological structure comprises a vascular structure, and the biological signature comprises one or more of a fork, a bend, and a loop in the vascular structure. In some implementations, the biological structure comprises one of a tissue configuration, a nervous system, or a bone structure.

In some implementations, the other vector represents a radiological image indicative of a disease, and where determining whether the vector is indicative of the one or more biological anomalies comprises diagnosing the disease based on the comparing. In some implementations, the other vector in the vector space is representative of a particular data item including a specified classification. In some implementations, the other vector represents an average of a plurality of vectors generated by the classification engine.

The remainder of this document outlines the related work in machine translation, graph isomorphism and grammar induction that lead to these results, the specific details of the proposed grammar induction method and its evaluation across three sample datasets.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
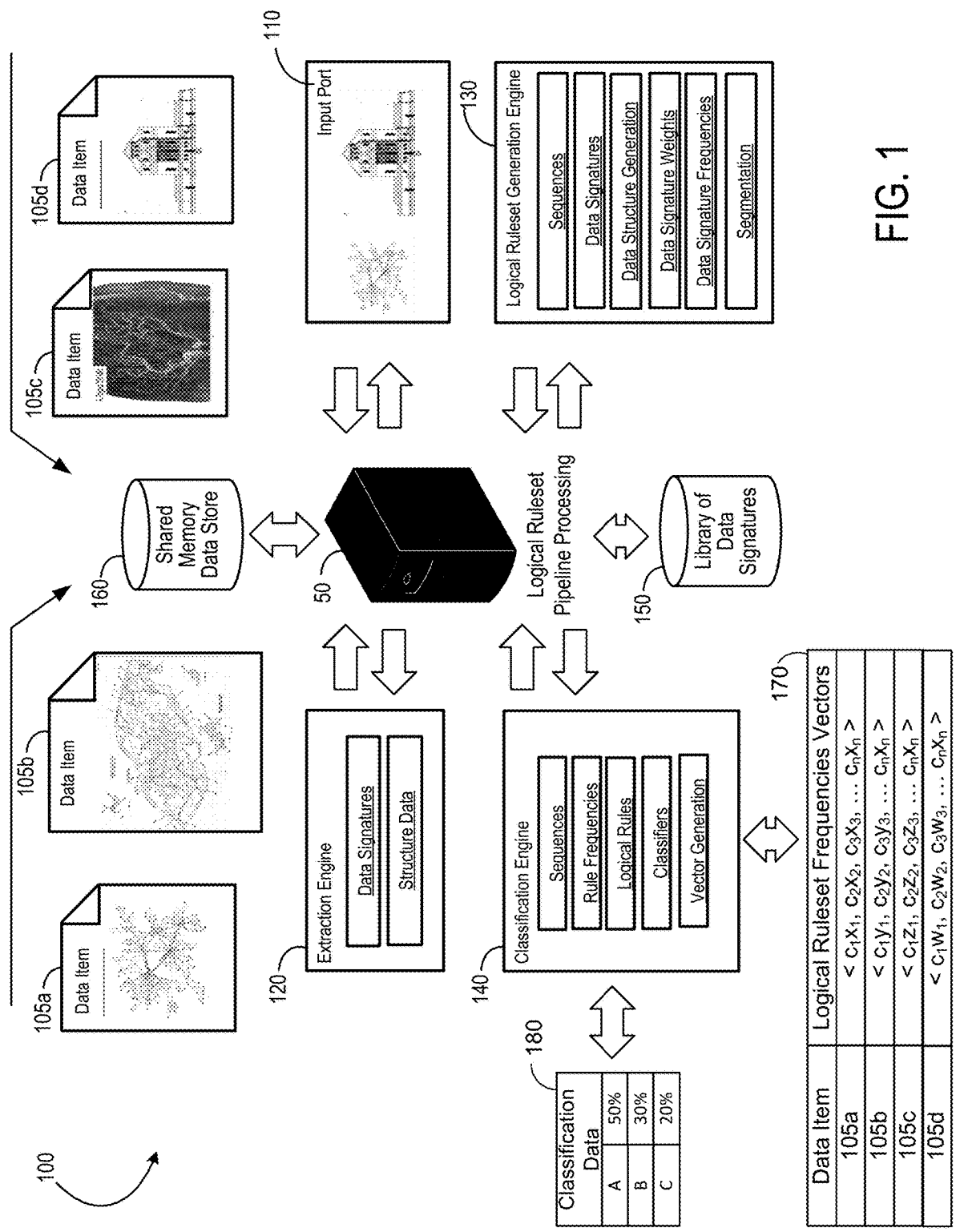
FIG. 1 shows a data processing system.

FIG. 1 shows an example data processing system 100. The data processing system 100 preprocesses data for a machine learning classifier. The data processing system 100 include one or more processing devices for logical ruleset pipeline processing 50. The data processing system 100 includes an input port 110, an extraction engine 120, a logical ruleset generation engine 130, classification engine 140, and a shared memory data store 160. In some implementations, the data processing system 100 includes a library of data signatures 150. The data processing system 100 is receives, at the logical ruleset pipeline processing processors 50, one or more data items 105a, 105b, 105c and 105d. The processors 50 of the data processing system process the data and execute the extraction engine 120, the logical ruleset generation engine 130, and the classification engine 140.

The input port 110 receives the one or more data items 105a-d. The data items can be stored at the shared memory data store 160, or at other locations. The data items 105a-d can be accessed locally or over a network (not shown).

The data items 105a-d include data that has an underlying structure. The data items 105a-d include images, text, videos, social graphs, data structures, schematics, node and edge graphs, graphics and graphic shapes, shape meshes, biological data and imaging, and so forth. The structure of the data items 105a-d can include word order, word frequency, word placement, pixel order and placement, graph structure, etc. The structure can be explicit, as for a graph, or implicit, as for an image. In some implementations, the structure is extracted by the extraction engine 120.

The extraction engine 120 extracts structure data and data signatures from the data items 105a-d. The structure data can be extracted by parsing the data item 105a-d. The structure data can include, for example, the structure of a vascular network that is identified and extracted by image processing. For example, a radiological image (e.g., an MM) can be received, image processed. The features of the image can be extracted to get the vascular system or other biological system such as a bone structure, nervous system, tissue configuration, etc. This can also be done for schematic data, where shapes can be extracted (and later formed into shape grammars). The data signatures include data features that are of interest in the image. These can be predetermined or determined from an analysis of the received data item. For example, data signatures include features such as a word or group of words in text, shapes, graph shapes, parts of a schematic, and so forth. The data signature depends on the type of the data item 105*a*-*d*. For example, for an extracted vascular network, the data signatures can include loops, bends, or forks in the vascular network, which are of interest in the field and may be used for classification and diagnosis purposes. The data signature can also be referred to as an "object," "token," or "node."

In some implementations, the library 150 of data signatures can be accessed, which can store specified data signatures that can serve a baseline data signatures for the extraction engine 120. The extraction engine 120 can compare the data signatures to the stored data signatures. Parameterization of the data signatures into parameters can enable "fuzzy" matching of data signatures, such as determining the identity of a data signature within a threshold based on parameter values of the data signature.

The logical ruleset generation engine 130 generates the logical rules (e.g., grammar rules or grammar shapes) which can be used to induce a graph of data, form other logical rules, or form vectors 170 (e.g., based on the frequency of each of the rules in a data item 105*a*-*d*) which are useful for classification of the data item 105*a*-*d*.

The logical ruleset generation engine 130 receives the data signatures and the structure data from the extraction engine 120. The logical ruleset generation engine 130 generates a graph of the data signatures in accordance with the structure data. For example, for text, this can include generating a graph indicative of word order and word frequency. For example, for a vascular system, this can include turning the vascular system into a graph of nodes and edges, where features of the vascular system extracted as data signatures are nodes and the structure of the system are the edges. For a schematic, the parts of the thing represented by the schematic (e.g., a car, building, etc.) can be the nodes and how they are connected defines the edges.

The logical ruleset generation engine 130 segments the graph around a data signature. The data signature chosen can depend on a ranking of the data signature among other data signatures. The ranking is performed to identify the data signatures most likely to inform the classification of the data item. For example, for text, the data signatures can be ranked by word frequency. For other data item types, other metrics can be used, such as a specified weighting system. For example, for a building, columns may be ranked higher than windows as data signatures. Other such ranking schema are possible.

The logical ruleset generation engine 130 segments the graph around the chosen data signature to generate one or more sequences of data signatures that are connected to the chosen data signature. This can be exhaustive (e.g., all possible sequences are found) or partial (find enough sequences such that one or more rules can be determined from them). Segmentation involves traversing the graph that was generated, starting from the data signature, until either a length limit is reached (in which case the data signature may be sub-divided into sub-signatures) or until the graph ends. For subdivision of a data signature, for example, one or more features of the data signature are identified as new data signatures and the process can be repeated for the newly identified data signatures. For example, a data signature representing a widow of a building might be sub-divided into features of the window (shape, size, etc.), The logical ruleset generation engine 130 generates logical rules (e.g., grammar rules or shape grammars) based on the sequences of data signatures. For example, the logical rule might be defined by the sequence itself, a portion of the sequence, etc. This process can be repeated for other data signatures to generate additional rules for the logical ruleset.

The classification engine 140 receives the logical ruleset and executes classifiers against the ruleset to classify the data item represented by the logical ruleset. The classification engine 140 can generate vectors 170, which each rule of the ruleset weighted (e.g., by frequency of appearance, length, etc.). Each of the vectors 170 can be used to represent a data item. A classification can comprise a distance between two vectors in a vector space, as described in further detail below. The classification engine 140 outputs classification data 180, which can be represented as probabilities.

The configuration of the data processing system 100 enables classification of a data item with little training data. Compared to statistical machine learning processes, far less training data (e.g., <10 data items) can be used to train the classifier to reliably classify data items. Using less training data by generating the logical ruleset enables the data processing system 100 to increase a processing speed compared to a data processing system that does not generate the logical ruleset. Using less data requires less processing, fewer iterations of training, and faster classification of data items.

In some implementations, a baseline vector can be stored or generated for diagnostic purposes. For example, a baseline image of diseased brain tissue can be used to generate a baseline vector used for classification. The classification engine 140 can compare vectors 170 to the baseline and can diagnose the disease represented by the baseline vector. For example, vascular anomalies can be detected in this way.

The stark difference between building grammars for translation and building grammars for design is that in general design problems do not use one dimensional data structures, such as those of written languages, and do not have clear representations, such as letters and words in written languages. Instead, shape grammars use rules that refer to shape elements such as points, lines and surfaces to visually represent designs, and Graph grammars, which refer to sets of rules that adjust a graph's ontology introducing nodes or edges. The sophistication of grammars used in design over those of language is important in several specific ways. Most directly, more complex representations introduce new ways to parse the data to be induced into a grammar, because where in text every word is immediately preceded by at a maximum one word, and tailed by at a maximum one word, in a graph, any node could be connected to a large number of other nodes, and this must be accommodated to build a complete grammar.

Figure 2:
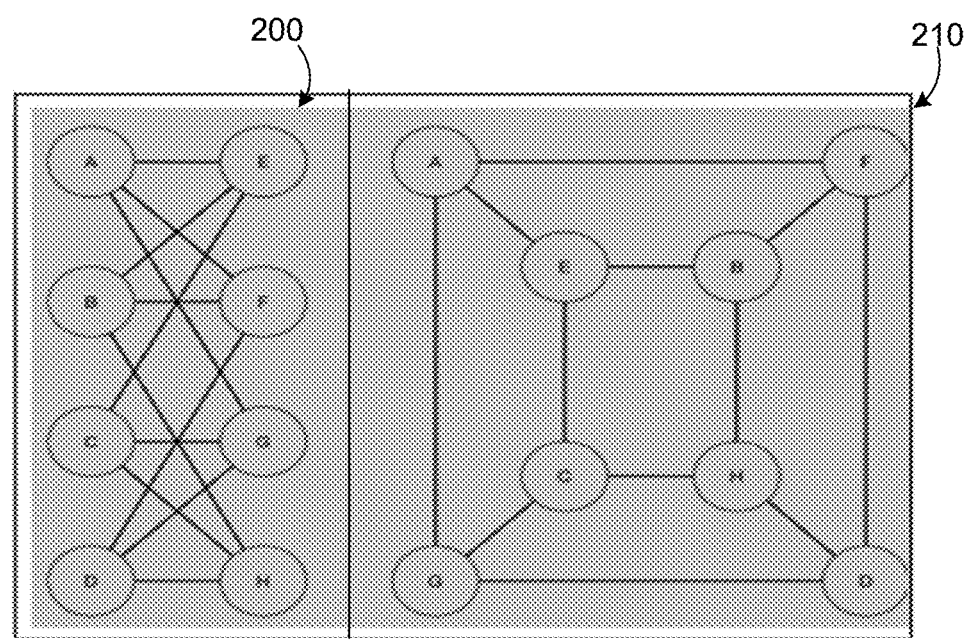
FIG. 2 shows graph isomorphism.

Another aspect that makes building grammars for graphs challenging is that checking if two rules are the same is computationally intensive, and becomes exponentially harder as the average degree of the graph increases. In other domains, this problem is known as a subgraph isomorphism problem, in which the task is to efficiently compare two subgraphs and determine if they are the same graph. FIG. 2 shows two graphs 200, 210 that are identical in terms of connection but completely different in terms of visual arrangement. These graphs are isomorphic, but do not appear so. Graph isomorphism is widely considered nondeterministic polynomial-time hard (NP hard) (though recent work in this field intends to show that it may be polynomial).

The current state of the art approach to computing solutions to this type of problem are on the order of 2O*(sqrt(n)*log (log(n))).

Humans can process higher-level similarities intuitively, so when building design grammars they usually have the advantage of not needing to spend the time to determine if two parts of an ontology are identical using brute force. Computational analysis does not have this intuitive advantage, so, for example, determining if two car door moldings from opposite sides of a car are the same door or a different door requires an extensive search involving finding an orientation in which similarity and symmetry are matched and then evaluating on a per node basis if the two parts are similar. With shape grammars, the nodes might be sets of vertexes or B-Splines while for graph grammars representations the nodes are some other kind of data object representation depending on the context. Additionally, when considering richly connected ontologies, humans also have difficulty making intuitive sense of the similarities of graphs, as FIG. 2 demonstrates.

Inducing Grammars without Coded Data

Formulating formal grammars is a critical step in machine translation. However, language data is full of examples of misuse, so probabilistic grammars can be used when formal representations cannot be computed. In these situations, a field of representations is used with probability weightings to generate systematic awareness of which cases are most likely to be the ones that should be formalized. Approaches like these afford inducing grammars from datasets that exhibit specific properties such as an annotated vocabulary, but cannot effectively support inducing grammars from generalized data; in other words, they do not resolve situations with no syntactical coding. As a result, they are not particularly suitable for making grammars in design more available or powerful at this time, because they would require input data with some structural coding, but may become useful as more dynamic approaches emerge.

In addition to the reasons mentioned above, generating grammars automatically requires assessing many possible rules, and there are few metrics for determining the single best grammar out of a set of possible grammars. As a result, high-level sketches for shape grammar automation have been proposed, and some parts of the process have been automated with statistically generated rules. However, these too do not sufficiently solve the issue for arbitrary design grammar induction, which remains a major underlying challenge.

Evaluating Grammar Generation

In design, a grammar's effectiveness can be judged first by its ability to communicate style, and then by its ability to do so in an optimal way, from a computational performance perspective. As a mechanism for conveying style, there are at least 3 critical previsions for effectiveness: 1) it should clearly convey the common elements of stylistically similar artifacts, 2) it should be complete enough to facilitate determining if an artifact is within a style or not, and 3) it should be usable to generate new artifacts that adhere to the style but were not part of the style corpus.

The accuracy of a grammar is defined as how well the grammar affords representing the input materials used to establish it. However, quality of representation is essentially binary with non-probabilistic grammars because there is no margin of error—it is either correct, or not correct—so for the sake of this work, accuracy is assumed a requirement of any grammar. Without this feature, the grammar is not even reliable enough to reproduce its own input and it should be rejected. Accuracy reports the percent of instances that a grammar induction system that can produce their input.

The variability of a grammar is defined as how well a given grammar can be used to generate new examples of the style or construction rules embedded in the grammar. Again, with non-probabilistic grammars, a grammar either offers variability, or does not, so this will be considered a necessary condition for a grammar to be accepted. Variability reports the percent of instances of a grammar induction system that can produce alternatives to their input.

Another aspect of a grammar system is the expectation that a similar grammar could be achieved from different observed artifacts. A practical example of this is if one builds a lingual grammar for English from two different instances of the New York Times Newspaper, there would be some hope that the contents of the two grammars would be similar and functionally interchangeable. We term this as the repeatability of a grammar, or the likelihood that grammars A and B will be identical when grammar B is learnt based on material generated from grammar A. In practice, grammar variability means that most data can be represented by many different valid grammars, so it is better to require that there is a grammar B in the set of grammars learnt from material generated by grammar A, such that grammar A and B are functionally identical. For repeatability, it is assumed that grammars of two different artifacts are comparable, as opposed to determining the degree to which one grammar serves two different artifacts. However, these two approaches end up being computationally similar in the worst case, because applying a grammar to an existing artifact is approximately as hard as developing a new grammar from that artifact. Repeatability reports the percentage of paired rules when computing a rule set from an induced grammar output.

Determining if two different grammars can have identical output, with only a difference in complexity is nontrivial. Prioritizing conciseness in generated grammars can be established by adhering to the information axiom found in Axiomatic Design if two designs are otherwise equal, choose the simpler one. When learning grammars, and after ensuring they have accuracy, variability and repeatability, the next priority is to establish that the selected grammar is the most simple. In practice, this is convenient for computational complexity but also because it implies that more salient information is stored per grammar rule, so arguably, it can demonstrate more nuance in alternative outputs. Conciseness is reported as the percentage of rules in a grammar per unique tokens in the data.

Together, accuracy, variability, repeatability and conciseness offer a multifactor means for establishing computational optimality as well as effective communication of style. Achieving the first two is a necessary condition for a grammar to be considered effective, and the latter two offer helpful insight when deciding which grammar representation best suits a given data set.

Figure 3B:
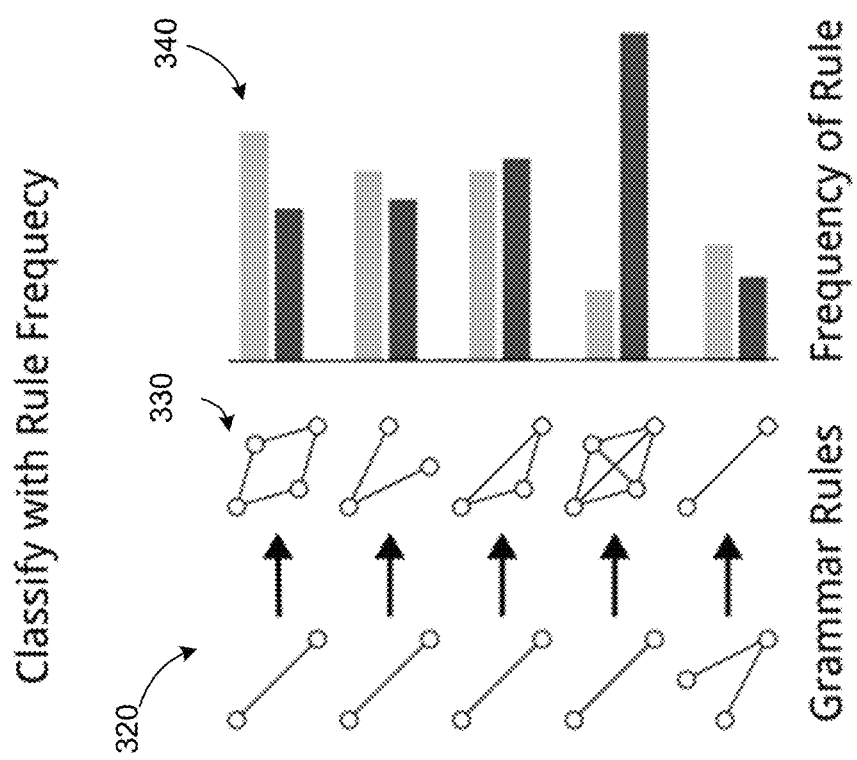
FIGS. 3A-3B show an example pipeline for pre-processing data to induce logical rules.
Figure 3A:
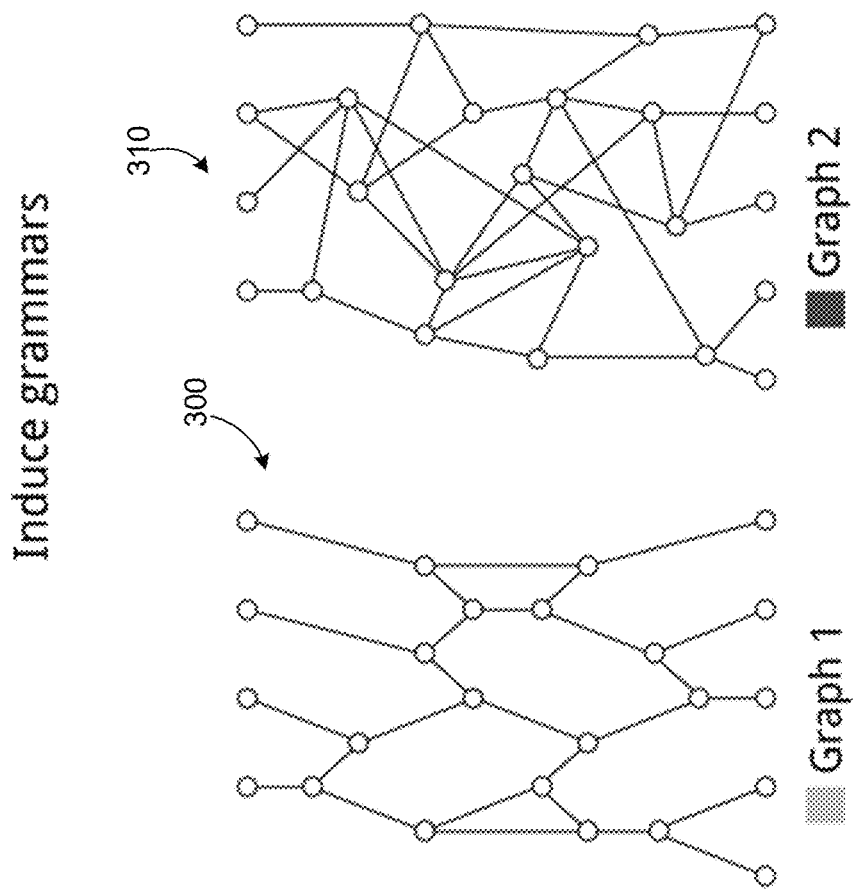

This work introduces a classification approach by generating a vector space reflecting the frequency of grammar rules derived through an automated grammar induction process (illustrated on two node graphs 300, 310 in FIG. 3A). Starting with comparable structured data cases that can be characterized by graphs, grammars are induced from each case, generating a series of grammar rules. The rules appear as transformations 320 based on subgraphs from the data, and the frequency 340 with which they occur in the data serves as a classification features 330, shown in FIG. 3B. In this way, subtle differences captured by induced grammars provide a tangible differentiator, even when similarities are not visually obvious. Because this approach converts singular cases into complex sets of semantic rules, this technique can be used for near one-shot learning, where traditional statistical learning approaches may require large amounts of exemplar data to learn a suitable representation of cases to make an accurate classification.

FIG. 3A shows the grammars of two example graphs are induced into a set of common rules. Graph 1 depicts a less complex graph while graph 2 depicts a more complex graph with more connections per node on average. FIG. 3B shows how often each rule appears in each graph, a frequency representation is produced. In this example, increased average degree greatly influences the frequency of one particular rule, making classification of these graphs straightforward. The colors in the frequency chart indicate to which graph they relate.

The rule frequency method is validated in two experiments: evaluating its sensitivity to graph augmentations, and evaluating its ability to detect differences between automobile classes. Sensitivity analysis is conducted comparatively to OddBall, a common graph based statistical classification technique. The rule frequency based approach introduced in this paper detects smaller differences in simulated graphs than OddBall given the same training sets, and is able to learn significantly faster. Additionally, the rule frequency technique is able to classify a majority of automotive categories with complete and partial representations of cars in as few as one comparison.

Classifying designed structures as being genuine or not has been an important area of ongoing inquiry. Establishing the legitimacy of art or writing, establishing who built what, and more recently, establishing if a designed product is brand name or counterfeit, etc. are all examples of this overarching need. Traditional techniques for detecting these differences include decomposing complex systems into their fundamental elements, and classifying instances by identifying features unique to them. The frequency-based approach introduced in this paper mirrors these traditional techniques in an entirely automated pipeline, with a particular focus on systems and artifacts and datasets representable with graph and shape grammars.

General Anomaly Detection

Anomaly detection is conducted with a wide range of approaches depending on the particular needs of the application. Distance metrics and frequency-based representations are two overarching categories of approaches. Distance metrics use a heuristic to compute the distance in some vector space between cases to formalize the cases difference. Initially theorized to establish the degree of difference between biological samples based on genetic feature maps, this technique has also seen use in measuring the distances between designs, both analogically, and based on structural features. These vector space techniques are also formalized under Hilbert spaces. For these methods to work, a threshold distance is established that indicates a distance to be considered problematic. Sensing thresholds in high dimensions is also a field of rich discussion, however in this work only elementary methods are sufficient (e.g., nearest neighbors (KNN), so a more in-depth exploration has not been included.

Frequency based approaches rely on detecting differences in frequency distributions of particular features in a sample. Methods utilizing this type of detection have been a center point in outlier detection in the data mining and machine learning communities. In particular, techniques such as frequent subgraph mining, typified by gSpan and AutoPart, have been used with great success to find graph anomalies and outliers. OddBall is a technique for identifying anomalous nodes in a graph based on topology characteristics that has many similar properties to grammar-based techniques, so it will be used as a basis for comparison in this study.

OddBall identifies anomalous nodes in a graph by using a mixture of graph properties and eigenvalues in complex graphs. The approach focuses on the local subgraph, relying on the local structure of a graph in a similar way that grammar rules may be defined. In this way, it shares many properties with a grammar-based approach, and critically, it works unsupervised, being able to establish difference metrics without knowledge of states, so it serves as a reasonable method for comparison, with which to establish a performance and functional baseline. Unlike the proposed grammar method, OddBall requires learning data in order to provide accurate detection.

Shape Grammar as a Basis for Detection

Shape grammars have been used to provide classification for product designs in a predominantly manual pipeline. This generally involves first building an overarching grammar, then establishing if the grammar can be manipulated to represent a challenging case. Due to the manual nature of this process, human perception of rules is a potential source of inaccuracy, but additionally, the large amount of time it takes to conduct such a procedure makes comprehensive analysis impossible. As a consequence, statistical shape base analysis of designs have been leveraged as an aid in generating concepts, but this approach does not have the semantic coherence of a full grammar representation.

Grammar induction has been automated for a range of types of data in computational design and machine translation literature. A distinguishing factor of these approaches is how much information about the data being induced is required. In design, coded visual design data, such as semantically coded parts of a website, are used in automatically inducing Bayesian grammars, while another approach can statistically deconstructing visual information without semantic coding. Statistical shape grammar techniques are also been applied in automotive design. An automated, non-statistical shape grammar induction technique for uncoded design and graph data is also introduced, allowing inducing grammars for almost any kind of structured data with a graph representation. This final technique serves as a starting point for the rule frequency based analysis proposed in this paper, and is described herein.

Rule Equitability

Frequency has served as a foundational indicator in information processing techniques (e.g., using a Fourier transform for spectroscopic classification of biological or chemical elements). However, to facilitate measures of frequency, equitability must be assessable over the elements for comparison. In other words, if rules cannot be differentiated, and equated, then frequency for rules between cases (e.g. designs) being compared cannot be derived.

Equating rules is nuanced because in many situations rules can be used to make other rules that may be within a grammar. To address this challenge, isomorphism techniques are required for identifying and reducing rules that are hard to otherwise compare. Markov equivalence classes provide a mechanism for formal identification of unique subgraphs by establishing an essential graph that embodies the core ontological relationship of a particular subgraph component. This approach, though not traditionally used in this way, is useful in identifying rule similarities because rules can be treated as subgraphs. Similarly, sets of rules can be identified as a combination of subgraphs. When a rule and a set of rules have the same essential graph, they conduct the same ontological function as rules in the grammar.

Methods

Figure 4:
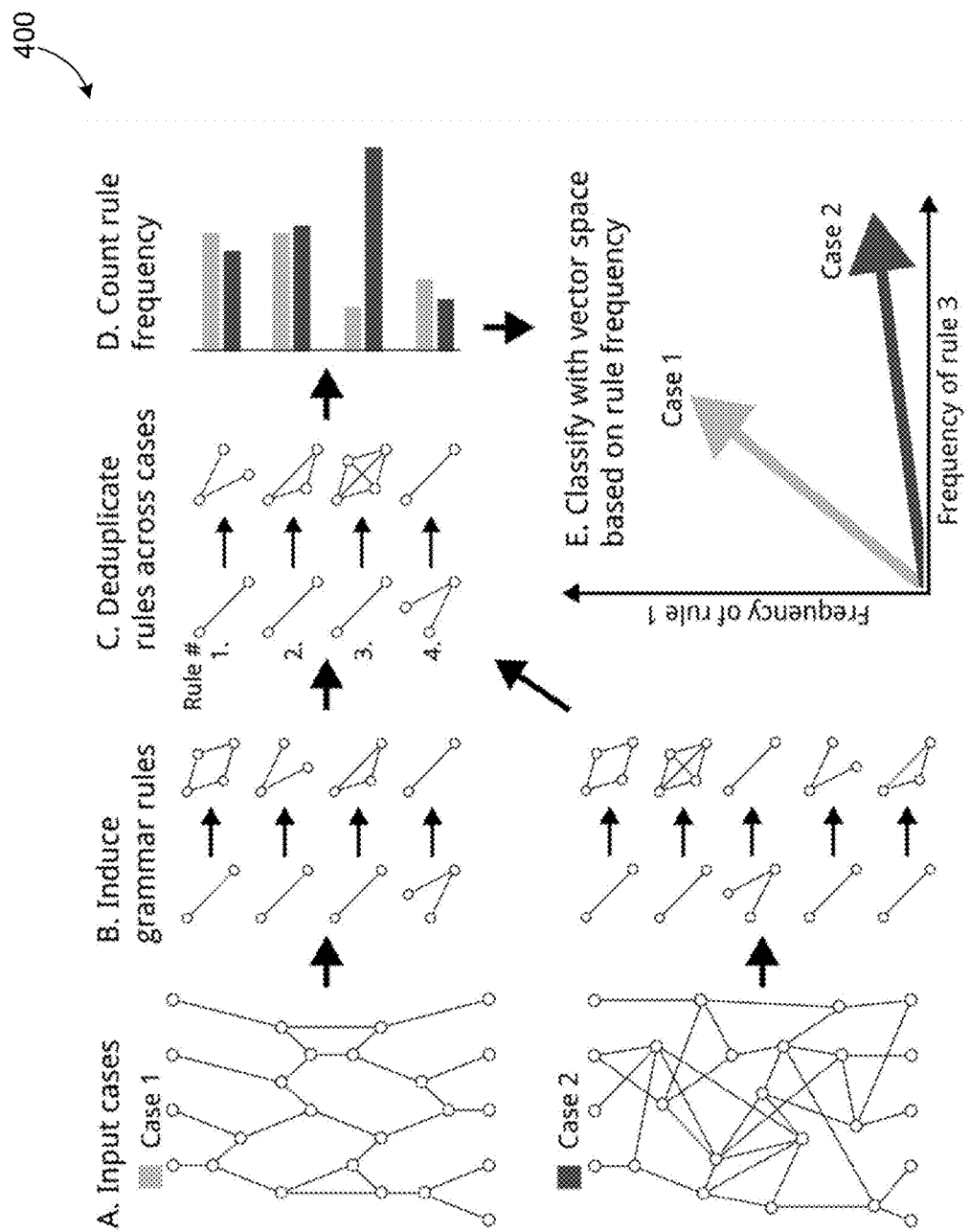
FIG. 4 shows a logical ruleset induction pipeline.

The data processing system 100 is configured to preprocess data for automated classification. This approach leverages shape grammar induction, rule de-duplication using Markov equivalence classes, multi-scale rule frequency checking, and case representation based on Hilbert spaces, enabling the use of many classification techniques. Each step in this pipeline, shown in FIG. 4, is described in detail below.

A, Input 2 cases (case 1-green and case 2-red) B) Automatically induce grammars for each case, C) search for and remove duplicate rules; rules are given unique identifiers to facilitate efficient processing, D) process the frequency of each rule in the original cases and, E) treat the cases as vectors in a vector space of rules. For this example, only two rules are visualized, rule three on the x-axis and rule one on the y-axis.

Automated Grammar Induction

To use shape grammars for classification, the first step is to establish a reliable mechanism for acquiring consistent grammars from data. Depending on the source and features of the data, a range of approaches can be used. Essentially, any method is acceptable as long as it can produce induced grammar rules with consistency between the test cases being compared. In other words, a method is suitable, as long as there is consistency in which properties of the data are interpreted as nodes and edges. For this reason, all data discussed in this work will explicitly describe the high-level segmentation approach of the data into a graph. It is important to note that many traditional uses of shape grammars are implicitly similar to graphs in the sense that line drawings are a form of a graph and their rules are made up of subgraphs of that graph, so shape grammars and graph grammars are treated with the same approaches in paper.

In this work, a general mechanism for inducing grammars from un-coded data is used as the underlying approach to establish grammars for processing, shown in FIG. 3B. It has been used because it offers flexible and generic grammar induction, not requiring precoding of induced data, and being agnostic to both data complexity and structure. The approach breaks the data into tokens, generally the smallest meaningful units of the data, and then recursively examines tokens' relationships to find the most commonly repeated patterns in the graph and defines rules based on those patterns. As more tokens are processed the number of rules iteratively grows, and the related elements of the graph are replaced with the new rules. Because this happens recursively, earlier rules are often referenced by later rules, and consequently, a network of rules emerges that can generalize the structure of the induced data.

The implementation in this work uses a random starting point and a random walk, moving through the graph choosing the next node to evaluate at random from the connected nodes, to explore the unevaluated parts of the graph. Additionally, forming groups of parsed tokens and rules based on proximity within the graph facilitates faster rule generation by providing a kind of rule chunking. Together these techniques constitute the first stage of rule frequency based classification, establishing the set of rules across all cases, which will then be deduplicated between cases, and have their frequency assessed in the data.

Removing Duplicate Rules

After using a representative sample of test cases to induce a grammar with the previously described automated method, it is necessary to remove duplicate rules and to remove small groups of rules that are functionally equivalent. This is done so that a functionally similar part of two cases will be identified as similar when comparing with the grammar rules, which is necessary to perform accurate comparisons of sets of rules from different cases.

Many repeated rules are easy to identify; if the left hand side and right hand side in each case match, then it is reasonable to consider the rule identical. However, identification of small groups of rules that have similar collective function (but are made up of unique rules) is not straightforward.

Markov equivalence classes identify groups of elements with shared members through an adjacency matrix representation. Groups are formed for chains of rules that share input and outputs. In this way, chains of rules found in one case 500, which compare identically to chains of rules found in another case 510, may be treated as similar meta rules and removed, even when the individual rules making up these chains do not compare exactly.

Figure 5:
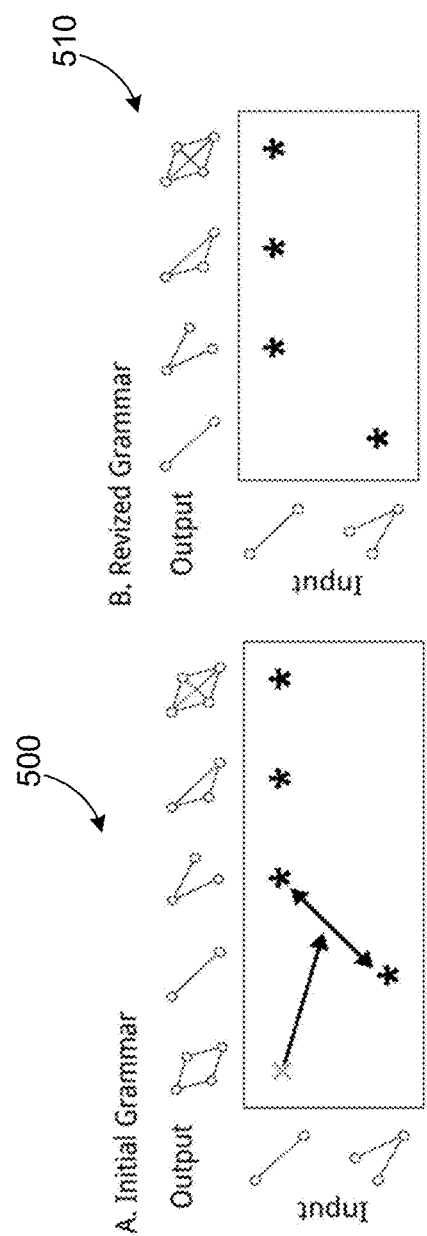
FIG. 5 shows an example of rule deduplication.

FIG. 5 shows an example of removing chains or rules that have the same function. Graph 500 shows a matrix showing all rules for given input and output pairs. The rule marked with an x can be removed because the rules it points to can be used in succession to provide the same function. Graph 510 shows the simplified rule set, which now has one fewer output tokens.

This process involves checking each possible subgroup of rules against its counterparts, essentially creating a higher-level rule for each subgroup of rules. These higher-level rules can be compared rapidly in a pairwise fashion, but the process of checking each subgroup is computationally intensive. However, in practice, and in the examples conducted for this work, grammars are generally much smaller than 10,000 rules, and at this scale, the delay is unsubstantial for a standard modern computer.

Ranking Rules by Frequency

Having established a set of shared rules, the instances of each rule are counted in each case to be compared. This is straightforward with simple rules in which both the left and right hand sides are particular elements or configurations. However, meta rules, which are rules containing other rules and thereby encompassing high level, abstract relationships in the data, are only applicable when all the standard rules have already been applied. For this reason, all the standard rules are counted by applying them to the data. Then the meta rules can be counted by applying them to the combination of data and rules that have already been applied, since meta rules often operate on rules themselves.

Rule frequency for each case is used as the core representation for learning and classification. Because groups of comparable cases are likely to share a majority of rules, after the initial induction process, further induction is not necessary except when there is a situation in which a rule is missing. If, in the process of checking rule frequency on a particular case, there is a part of the data which no rule can be paired with, this is an indication that the ruleset being used does not completely define the relevant design space. In this situation, the new case should be induced and frequency counting should be repeated for any previously evaluated cases, to avoid biases due to the earlier, partial rule set. In practice, this is an uncommon situation because needing to reevaluate rules tends to indicate that the differences between the cases of data are very significant, and may be obvious without utilizing a grammar-based approach.

Classification Approaches

Given the convenient rule frequency abstraction, many classification approaches are directly applicable. In this work, a simple vector space based mechanism is used as an exemplar, but others may be useful depending on the particular classification task. The vector space approach was deemed suitable in this work because it demonstrates a familiar representation, which is compatible with many types of machine learning methods.

Treating each rule as a dimension in a vector representing a particular case, and the corresponding frequency of that rule in that case as its value, a Hilbert space of designs is derived, extending traditional vector space computation into high dimensions. Treating each rule as a dimension may mean that the space is thousands of dimensions, but the Hilbert space representation affords the use of standard distance metrics such as Euclidean distance with many dimensions, making the data amenable to detecting differences between induced cases using methods leveraging this representation.

Figure 6:
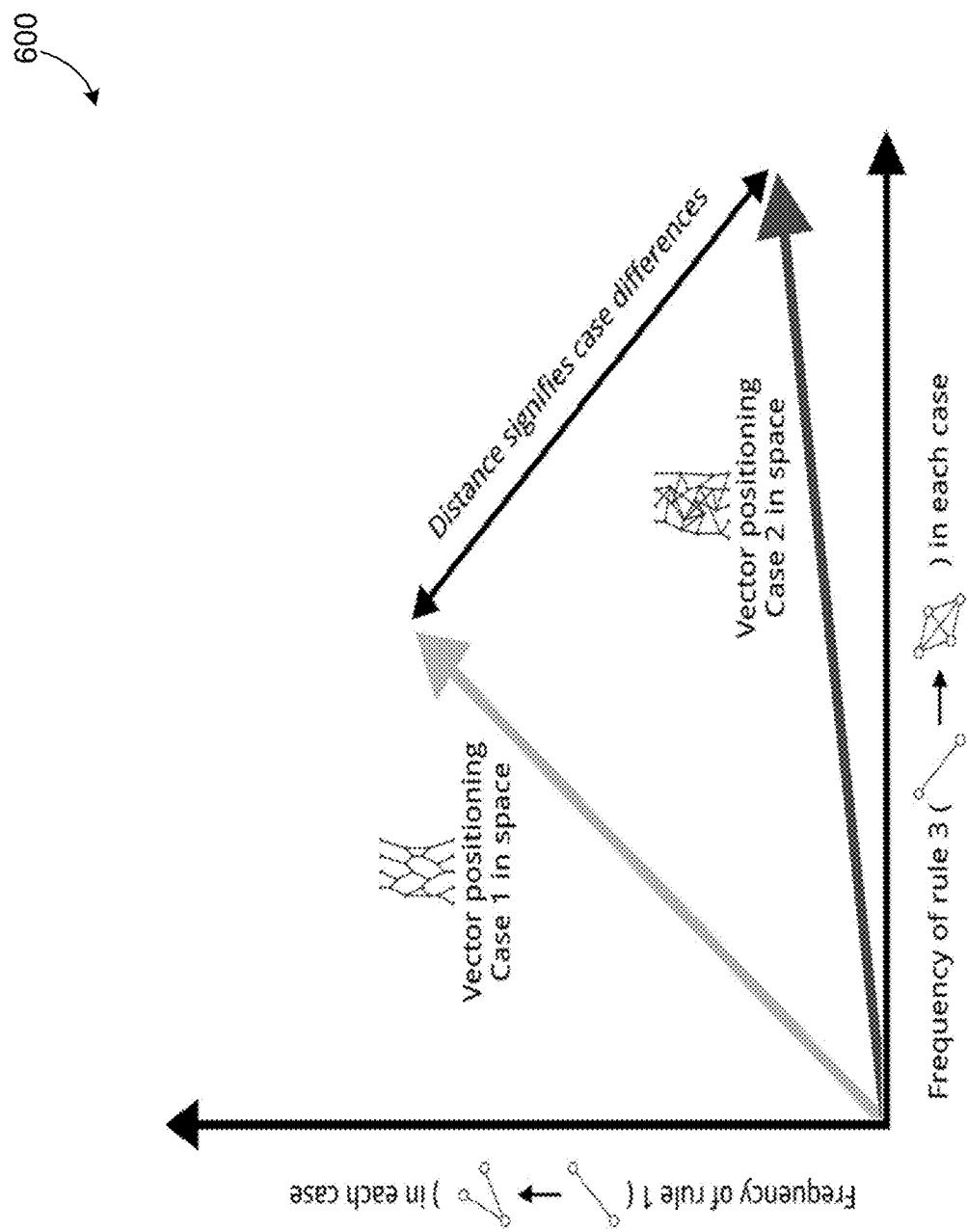
FIG. 6 shows an example of input classification.

FIG. 6 demonstrates a simplified classification example with two dimensions and two cases. The x-axis indicates the normalized frequency of rule 3, while the y-axis indicates the normalized frequency of rule 2 in each case, based on the rules defined in FIG. 4. In this way, the colored vectors show where each case would be positioned in this space, due to their differing compositions of rules. The distance between these positions in space is the difference between the cases in this representation.

FIG. 6 shows an example of treating cases as vectors in a high dimensional space. The depiction demonstrates two dimensions associating with two rules in a simplified example. The length of the difference between vectors indicates how differently each case utilizes the grammar. This can serve as a proxy for a more general difference metric, and is akin to the Euclidean distance within the space of cases. Only two dimensions are demonstrated for clarity, actual comparisons tend to integrate hundreds if not thousands of dimensions, one per rule in the deduplicated rule set.

The vector space representation also lends itself to many more sophisticated statistical comparison techniques. For example, nearest neighbors (KNN) could be used to establish a nuanced classification boundary if there were many cases to train with. KNN establishes a classification boundary based on the a priori classification of the K nearest training cases to the test case. Nearness is defined contextually, but the Euclidian distance serves as the purest interpretation of conceptual distance in this space. Other statistical learning and classification techniques are also facilitated by the discreet vector representation of designs proposed, however in this work only the KNN approach is applied for classifying cases in the vector space representations due to the simplicity of the model.

Although many classification techniques require parameter tuning, for example, determining the smallest distance considered significant, aspects of this system require minimal intervention because there are no integrated parameters for adjusting the grammar induction and vector space representation approaches. Additionally, once a case domain has been established, further classification comes at a very low computational cost, requiring only deriving a rule histogram and then performing the preferred distance classification technique with the resulting case vector.

Evaluation

To evaluate the efficacy of the presented approach, two experiments were conducted: simulated test graphs with adjustable differences of a variety of types were classified against an existing classification method, and, systems of splines specifying particular automobiles were placed in automotive categories from the literature.

Graph Classification

Classification accuracy was measured for comparison by determining the smallest measurable difference detected by the introduced algorithm and by the Oddball algorithm, over a battery of standard graph properties. Test graphs were generated to simulate graph abstractions of designs. Test graphs, like the ones depicted in FIG. 2, were used instead of graphs depicting actual designs because establishing small measurable differences would afford improved gaging of accuracy and granular comparison with traditional methods. Previous work with automated grammar induction demonstrates that test graphs of this type have similar properties as induced grammars to their design counterparts.

The Test graphs were simulated with a random graph function in the NetworkX python package with a target graph size of 1000 nodes and 50 unique node types. They were then measured for graph properties, and small modifications were made to achieve slightly different graph properties with a similar graph. The graph properties studied are all standard measure of graphs that can be readily evaluated: 1) Circuit rank, the smallest number of edges that can be removed to achieve an acyclic graph, 2) Average diameter, the average distance between vertices, 3) Average girth, the average minimal unique cycle size, 4) Clique number, the number of nodes in a clique of maximal size, 5) Book thickness, the smallest number of independent planes with a common edge, on which a graph can be represented, and 6) Boxisity, the number of dimensions required to represent a graph's edges through a Venn diagram style formalism. These are selected because they are fast to calculate for a given graph and change relatively independently of one another when modifications are made to graphs. Values of these properties were each normalized over a unit interval to allow for a consistent comparison protocol.

Generated graphs were augmented by adding edges between a random pair of nodes in an existing graph. During this process, graph statistics were calculated at each change. In this way, new graphs with different levels in each graph statistic could be found and added into the dataset. The frequency of augmented graphs was logarithmically dependent on their distance from the original generated graph. In this way, more test cases were similar to the original graph and fewer were different.

In addition to using the automated grammar based approach for classification, OddBall, was used to set a baseline for functionally similar techniques. OddBall was set up to use the same data for classification, but due to its inability to conduct one-shot learning, 10 trials were conducted as a singular training set, with cross validation performed against 1/10th of the data.

Automotive Category Classification

Automotive categories utilized a dataset of spline measurements from 49 automobile bodies, encompassing 23 independent splines common among automobile designs. These data encompassed three distinct categories of automobile, coupe, sports utility vehicle (SUV) and pickup truck. This data enables grammatical analysis using the automated induction techniques by evaluating splines as elements in the structured graph to be induced. Additionally, by modulating spline parameters, a continuous space of automobile designs can be established allowing for a larger dataset to be evaluated with minimal cost to the data quality.

In this experiment, known automotive models and generated automotive models spanning the parameter ranges of the known models are classified into automotive categories. Generated models are used to standardize the number of cases to 100 in each category so that fair comparison can be conducted between more and less populated categories. Categorization is conducted using nearest neighbors in the grammar rule Hilbert space, and differences between designs are established with Euclidean distance. OddBall is not used here for comparison because of the nature of the representation OddBall uses, relying on anomalous features on the graph level.

Figure 7:
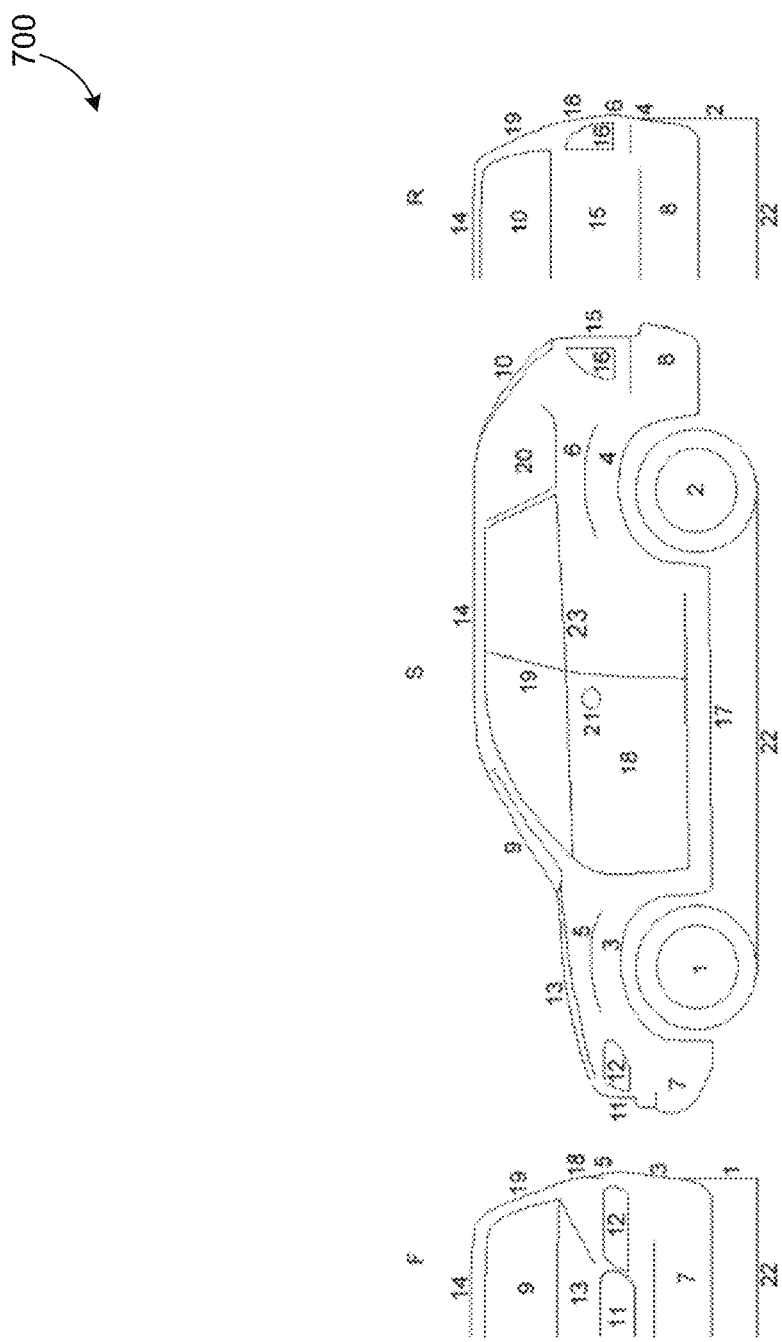
FIG. 7 shows an example application of classification by induced logical rules.

FIG. 7 shows an example application of classification by induced grammar rules. Vehicle splines for automotive category classification. The vehicle splines utilized: (1) front wheels, (2) rear wheels, (3) front wheel well, (4) rear wheel well, (5) front fender, (6) rear fender, (7) front bumper, (8) rear bumper, (9) front windshield, (10) rear windshield, (11) grill, (12) headlight, (13) hood, (14) roof, (15) trunk, (16) taillight, (17) rocker, (18) door, (19) front side window, (20) rear side window, (21) door handle, (22) ground, and (23) belt line.

Methods for Grammar Induction

Figure 8:
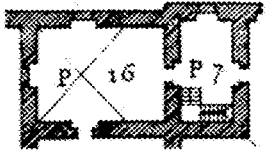
FIG. 8 shows a process for generating logical rules.
Figure 8:
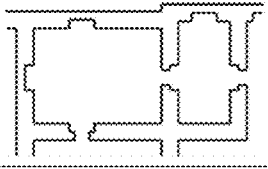
Figure 8:
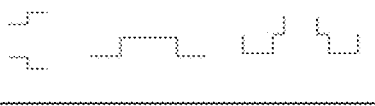
Figure 8:
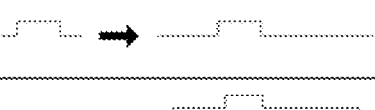
Figure 8:
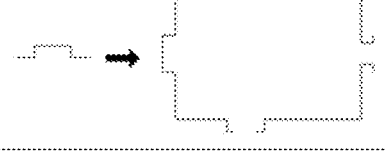
Figure 8:
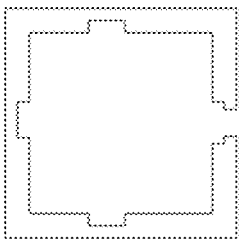

FIG. 8 shows a process for grammar induction. The approach introduced below induces arbitrary grammars from ontological data via the following steps: 1. deconstruct the data into objects that constitute atomic units of meaning in the context of the data (e.g., words in text, points in a drawing, people in a social network), 2. formulate structures from known relationships between objects in the original data (e.g., word pairs, lines, and friendships, respectively), 3. compute frequency based assertions about probable interrule relationships, 4. establish new rules from probable interrule relationships that were found. The resulting rule set will be concise, and complete, however it may also introduce a number of anomalous rules that can be removed by expanding the dataset and checking for ontological coherence. Lastly, a machine learning post process can be conducted to run classification over induced grammars of a variety of data sources in order to determine which adhere to a common set of creation rules, and which do not. In the following subsections these steps are discussed in detail.

Deconstructing Data for Grammar Induction

The first step is deconstruction of data into objects. This involves breaking a dataset down into the smallest units that are relevant to a grammar. This is done so that the dataset can be treated as a computationally addressable graph and so that patterns in that graph can be used to establish the grammar.

The process of data deconstruction is domain dependent and the approaches for deconstruction change significantly between different kinds of data and connectedness of the data. In text, words are very easily extracted producing a linear graph as is shown in Step 1 in FIG. 8. In more complex data, such as ontologies that represent buildings, data is split into entities like a light switch or toilet that is a participant in the overall system graph. Connections are interpreted as connections in the data structure, so objects like wires and pipes do not need to be explicitly treated as objects. If interpreting blueprints on the architectural feature level, points and lines can be treated as objects with positional information serving as the data structure; however, detailed positional data is not needed when treating these structures as ontologies because a graph representation alone can retain the same information intrinsically.

FIG. 8 illustrates several steps and sample output based on two types of data, text and a building plan (a subset of the Villa Malcontenta). Raw input data is segmented in step 1. Step 2 involves forming structures in the ontology. In step 3, relationships between structure sets are used to define rules. In step 4, parameterized relationships are used to form rules that are more sophisticated. Finally, output examples are shown that express different features form the input but also incorporate similar stylistic aspects.

Formulating Initial Structures

In the second step, structures are formed based on just the structure of the graph. For parsing text, this means the words before and after each word become strong candidates for rules and they can be processed without any awareness of the part of speech or meaning of individual words. Rules can later be expanded to encompass larger groups of words or parametric patterns as they are encountered by the parser. Step 2 in FIG. 8 demonstrates this, the initial formulation of structures.

In complex ontologies, rules are less straightforward. Ideally every traversal of every set of connections will be considered so all possible rule options are uncovered. This is not computationally practical, especially for heavily connected graphs, so constructing larger structures as chunks or sets of rules, by grouping or topological patterns, is used to reduce the load.

Probabilistic Enhancement

The frequency of a rule being found in the dataset is interpreted to be a great predictor of the likelihood of its use in the final grammar, so this is the main indicator that is used to determine how to extend initial rules of pairs of objects to encompass more objects as either one-dimensional lists or graphs. For textual data, this is a straightforward process of looking for repeated pairs or patterns on the rule level as is shown by Step 3 in FIG. 8.

For graphs, if any two rules match, the surrounding areas in the graph are evaluated and local patterns are defined. The process of frequency analysis for establishing rule likelihood is done continuously so by the time a pass of the data has been completed, a set of simple and more complex rules have already been established. This is necessary because the data is sampled randomly, to enhance computations speed. This way, for most datasets, all rules will be found before a full traversal of the data is completed.

Parameterization

Inter rule patterns are also established to extend the probabilistic rule set. This is very similar to evaluating a grammar on the rule level, as it involves looking for repeated sets of rules and builds parameterized rules that can refer to a contextual variable such as a rule or token that could be used to complete some part of the graph. Step 4 of FIG. 8 shows this in a text example where an object rule can be used to augment a new parameterized rule that has been developed. In practice, for text, these types of rules may represent higher-level features such as writing tropes or an author's particular writing style.

The parameterization of rich ontologies is a time consuming process because it requires the comparison of many rules to generate higher-level rules. This also ensures that groups of rules do not overlap significantly, which helps facilitate conciseness of the resulting grammar. This is arguably the slowest stage of the grammar induction approach but doing it after structured rules have been established reduces computation time.

Efficiency in Induction

The first and second steps are fast and run in linear time with the number of rules. The third and fourth steps are nondeterministic and slower than the first two, depending on the ease of establishing equivalence between rules. In datasets where rules are unidimensional, equivalence can be done very quickly by using a hashing function on both sides of every rule. Hashing functions allow mapping large input signals, such as many lines of text, to a unique and fixed length key. When data has more interconnection, such as in a social network or a building ontology, the hash approach only encompasses a single representation of the graph, and can lead to significant inaccuracies. The hashing approach only works on very accurate datasets and does not show any partial equivalence for noisy matches. As a result, in cases such as dealing with typos or poorly generated drawings, preprocessing of data may be required to create accurate matches to ensure objects that are semantically the same are interpreted as the same by the induction algorithm.

Instead of hashing, when inducing graphs, isomorphism is established using the fastest current algorithm. Additionally graph chunks can be hashed, affording speed increases as larger rules are constructed.

Classification Through Induced Grammars

The four steps outlined above establish that a grammar can be formed from arbitrary rule based data. Completing this process for many similar sources affords computational assessment of the structural differences between the sources. Given metadata about each dataset, classification can be conducted pairing features of a grammar with features in the metadata, allowing for quick analysis at a level that is not usually possible with these datasets and traditional machine learning methods.

Once a grammar is available for each candidate data set the classification procedure can be conducted with a range of approaches, depending on the specific features of the dataset and the requirements of the comparison. For example, by treating each rule in a grammar as a unique dimension in a high dimensional space, given samples can be mapped relative to one another and methods such as K-nearest neighbors or support vector networks can be used to quickly determine which samples exhibit similar characteristics. Added steps such as nominalizing overlapping rules between samples can be used to increase accuracy when enough samples exist. Similarly, breaking a given graph into small sections can be used to localize grammatical changes in the graph, which is convenient in identifying anomalous ontological features appearing only a small number of times in a large, complex graph.

Evaluation

Grammar induction evaluations were conducted on three distinct datatypes: generated patterned ontologies, a building with known grammar representations, and a structured piecewise model. Generated partnered ontologies allow analysis of the proposed methods in an abstract context and allow for ontologies exhibiting specific features to be evaluated. Evaluation of classification through induced grammars are not included in this work.

Many buildings have received attention from the academic community and have well established grammatical representations, which can be used for comparison. Because of the large body of existing grammatical analysis and clear rule abiding layout, Andrea Palladio's Villa Foscari, La Malcontenta, a home near Venice, Italy built in 1550, was chosen for evaluation. The piecewise model used is a 3D model of an integrated, automated greenhouse in which each part is individually modeled. Evaluating data of this kind allows multi-scale graph representation of the structure and facilitates highly accurate chunking. Analysis was conducted using the accuracy, variability, repeatability and conciseness framework.

Figure 9:
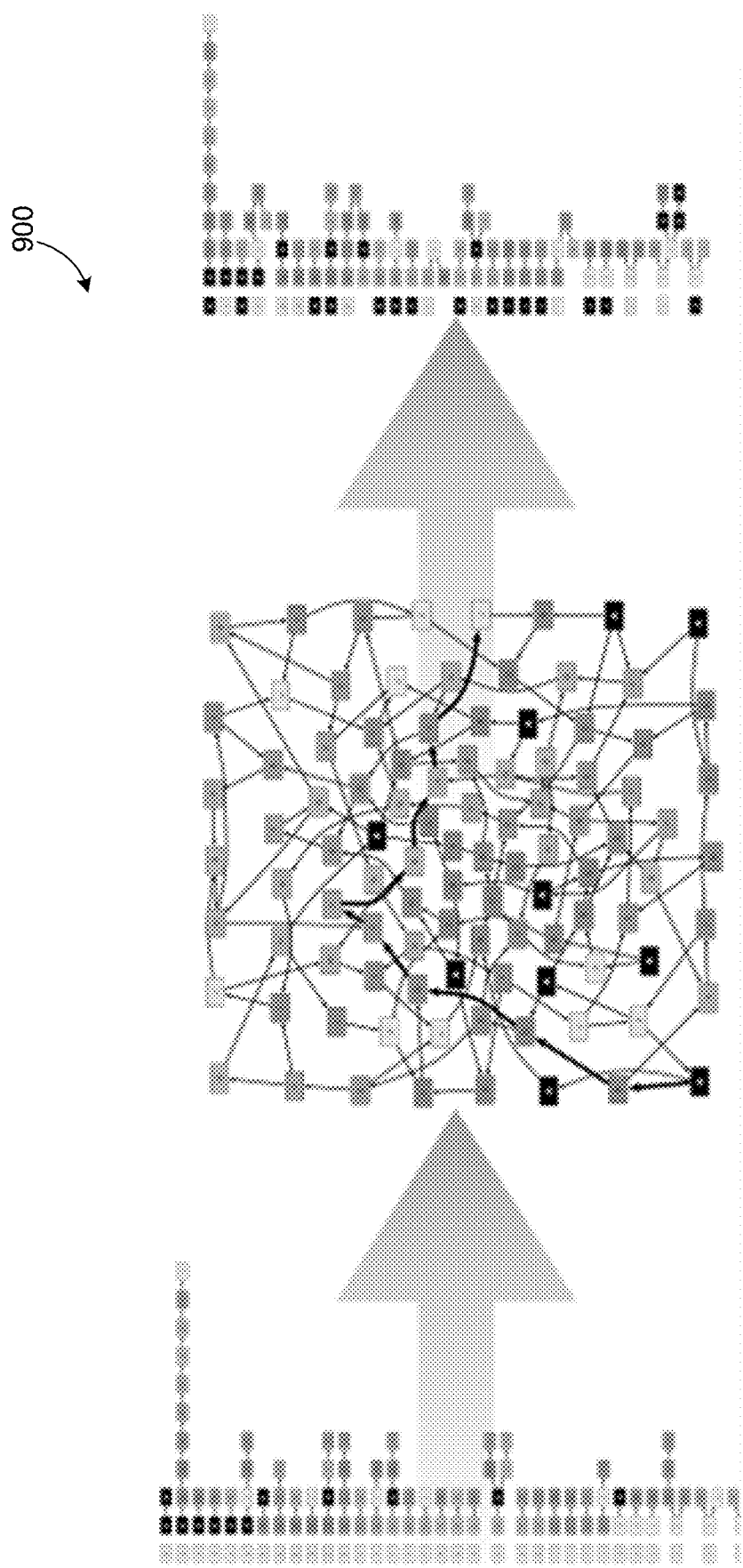
FIG. 9 shows an example of a graph generated by the data processing system.

FIG. 9 shows an example of a graph generated by the data processing system. Example Small Generated Ontology. Rules on the left are used to generate the graph of 100 nodes and the induction method is used to establish the rules on the right.

Inducing Generated Ontologies

Randomly generated grammar rules were used to build the artificial data sets, as opposed to purely random data, to ensure that there were sufficient patterns for the grammar induction algorithm to find.

A set of rules was constructed and they were then applied at random to produce datasets with certain size and connection properties. Graphs were generated with small (n=100, shown in FIG. 2), medium (n=10,000) and large (n=1,000,000) numbers of nodes and average degrees per node connection degrees of 2, 4, and randomized degree, emulating text, visual design, and ontological design representations. These evaluation sizes were chosen to emulate problems of vastly different levels of complexity. The number of unique nodes in each case was 10% of the total number of nodes in that trial. Trial data objects consisted of strictly typed Universally Unique Identifiers (UUIDs) for high-speed comparison.

The implementation was in Python 3 and interconnections were managed with the NetworkX library. All trials were run locally on commodity hardware with eight cores and in instances in which processing lasted longer than one hour, trials were cut short.

Figure 10:
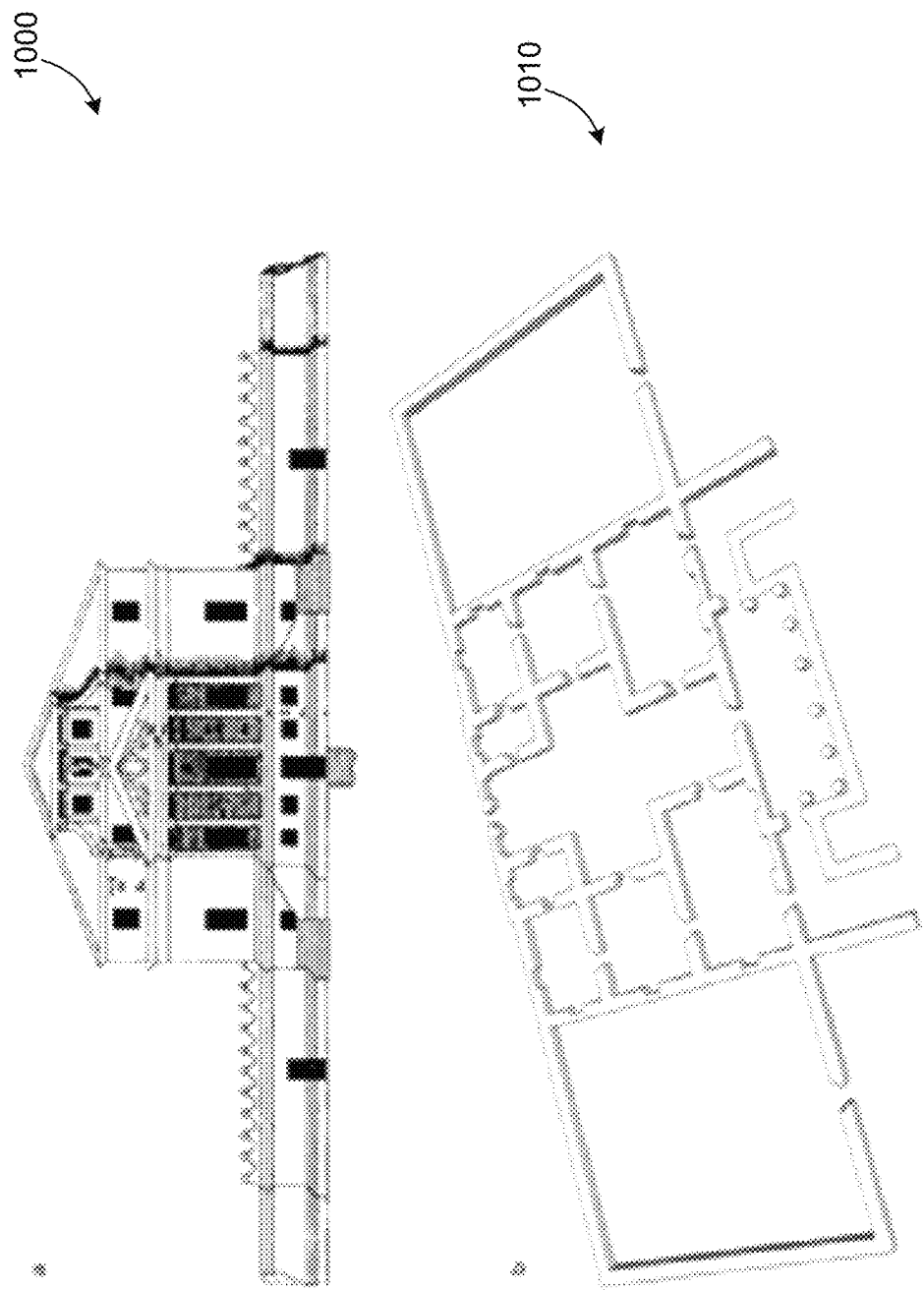
FIGS. 10-11 show examples of data items from which logical rulesets are generated.

FIG. 10 show an example of a data item from which a logical ruleset is generated. FIG. 10 shows an illustration 1000 of Villa Malcontenta from plate XLIII in Quattro Libri (11), and a CAD rendition 1010 of extracted plan features (e.g., data signatures).

Inducing Palladio's Villa

A three-dimensional model of the Villa Foscari, La Malcontenta was produced from reference drawings using a computer-aided design (CAD) package, and the load bearing walls and high-level plan were extracted, shown in FIG. 10. This data was chosen, instead of, for example, the entire 3D model, because it directly reflects the existing grammars that have been created for the dataset. The CAD data was converted into an ontological form in which the points making up each line segment were treated as nodes in the dataset and the lines were interpreted as their connections in the ontology. In other words, only places where lines end or join become critical. For example, a wall is interpreted as just the connection between the start and finishing points of it. Similarly, a door is just a relationship of points where the walls of two rooms meet. This way the grammar making process is not constrained by the physical structure of the building but by the relationships of each point to each other point. Spatial information was retained but not made available to the grammar induction algorithm so that the evaluation would be ontological while building shapes could still be visualized as is shown in FIG. 8.

Because of the relatively small size of the grammar for the test data, the ontology could be completely parsed to find all rules existing in the data. Computations were performed on commodity computing hardware and all finished in less than 1 hour, so no measures were necessary to accommodate for computational complexity here.

Assessment tasks were to attempt to formulate building primitives, and to recreate the input data. Palladio's buildings have been the subject of a large amount of research on grammars so rule sets for comparison are readily available, and were used as plausible alternatives in the study of the variability of the produced grammars. Conducting this pairwise rule comparison offers insight into conciseness and variability of a grammar.

Figure 11:
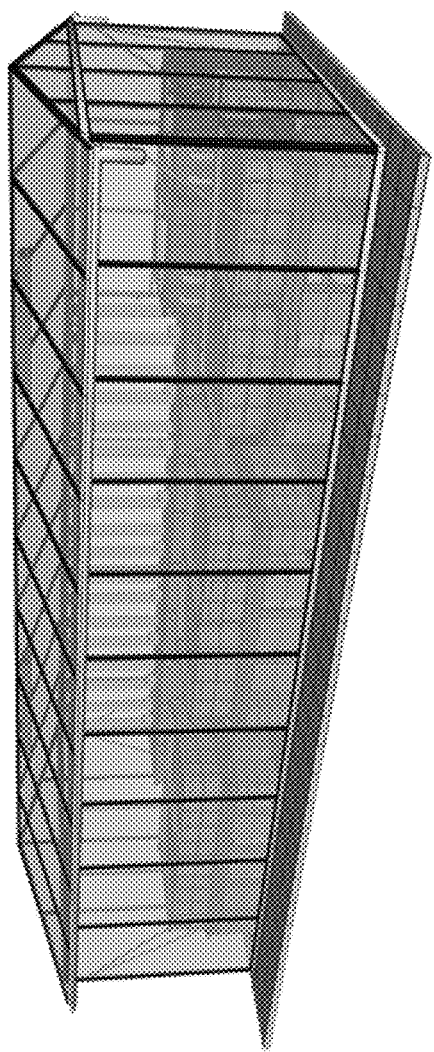

FIG. 11 shows a data item including a greenhouse model 1100, from which a logical ruleset of grammar rules can be generated by the data processing system 100. A SketchUp model of an aquaponics greenhouse with automated delivery systems. Components down to the bricks and fasteners are individually modeled and are represented discretely in a hierarchy.

The greenhouse model 1100 was produced using SketchUp and processed using the COLLADA 1.5.0 standard. The model contained approximately 700 components many of which were instances of other parts but configured in different relationships. All structural and machine components were included in the model but sub-assemblies were ignored when inducing the grammar because they were readily purchased in that state, (e.g., a pump or a lightbulb, would not be further decomposed).

Because of the nature of the COLLADA format, the model had an inherent structured representation so physical proximity was used to transcend structural isolation. In this way, when processing rule-chunking steps of the algorithm, only physical proximity was considered for building ontological relationships, hierarchical connection was not. This avoids giving weight to any assumptions made by the model's author for initial grammar processing.

Results

This research aims to evaluate how well automated grammar based classification compares with existing methods, both generally and in applications to design. In this way, the results for this analysis are grouped by research question, instead of by experiment.

The Rule Frequency grammar based approach detected smaller property differences on average than OddBall in simulated graphs, with the notable outlier of circuit rank (Table 1). Overall, the grammar method had an accuracy 8.6% better than OddBall did in aggregate, based on the average difference of detection accuracies of all the normalized properties across all rounds. Some properties had dramatically improved detection with the rule frequency methods, such as girth and book thickness, which were approximately twice as effective on average. The potential reason for the outlier is that the underlying statistic did not influence graph structure meaningfully, thereby being less detectable with the structure based grammar method than the mixed analysis of OddBall. However, the aim of this comparison is to show parity with Oddball first, and in the next segment of analysis, the rate at which each algorithm learnt is compared.

Within simulated graphs, smallest change detectible with significance (p≤0.05), normalized to a 0, 1 interval, with significance established against cross-validated cases over identical trials between evaluation methods.

TABLE 1

Graph property detection with rule frequency.

| Graph property | OddBall | Rule Frequency |
|---|---|---|
| Circuit rank | .25 ± .01 | .28 ± .00 |
| Girth | .23 ± .02 | .05 ± .04 |
| Clique number | .23 ± .08 | .16 ± .05 |
| Book thickness | .37 ± .09 | .17 ± .01 |
| Boxisity | .08 ± .06 | .07 ± .06 |

In the automotive categorization problem, the grammar based method was used to successfully classify categories (Table 2) based on statistical category ranges identified in the literature, with simulated and actual automotive data. The SUV category had most notable performance, which was attributed to its structural overlap with the other two categories, making it most likely to have comparable rule frequencies with all other automobiles. In other words, this result demonstrates how rule frequency functions well for differences in relatively similar data cases, a key tenant of the approach's design.

Furthermore, the key splines (e.g., shown in FIG. 7) were identified as indicative of particular category rule targets. The identified rule targets (Table 2) are those that were found as indicative of the appropriate category in the top 25% of rules. Functionally these align directly with features related to each category.

Table 2, below, shows classification accuracy indicates the percentage of models in that category that were accurately classified out of 100 trials including both existing models and simulated models adhering to the established categories. Rule targets' semantic interpretation is based on rule descriptions.

TABLE 2

Automotive categorization accuracy and key rule targets used for differentiation.

| Category | Classification accuracy | Rule targets |
|---|---|---|
| Coup | 76% | Tail light, headlight, grill, bumper orientation |
| SUV | 93% | Truck closure, rear window |
| Pickup | 82% | Truck bed, rear window |

As shown in Table 3, the amount of training needed to perform classification to a given percent accuracy is much smaller for the grammar based, rule frequency approach. In other words, the grammar-based approach achieves similar accuracy with much less training data, making it useful for situations in which there is limited available data to train on. The rule frequency approach requires at best, an order of magnitude less data than OddBall, which can be attributed to leveraging structural information, as opposed to a statistical process.

TABLE 3

Learning rate for generated graphs.

| Accuracy threshold | OddBall | Rule Frequency |
|---|---|---|
| 25% | 14 | 2 |
| 50% | 23 | 2 |
| 90% | 29 | 3 |

Table 3 shows the number of cases required in training, before a particular percentage of the achieved accuracy could be established. Trials are reported on cross-validated data, identical between detection techniques.

In the automotive problem, learning rate is not directly measured because there is no baseline. However, the classification conducted showed the same degree of consistency as the graph comparison. In other words, learning was effective after three instances.

Further results for grammar induction are reported on trial runs of generated datasets for specific complexity levels in Table 4. Reported values are the percent of resulting grammars that express accuracy, variability and repeatability while reported values for conciseness are the percentage of the ratio of rules to total data points, which agrees with computational bounds. All reported values are on 20 runs of the induction algorithm on the respective same datasets.

TABLE 4

Grammar Metrics

| Trial | Accuracy (% achieved) | Variability (% achieved) | Repeatability (% achieved) | Conciseness (% rules/n) |
|---|---|---|---|---|
| Degree 2 Ontology | 100% ± 0 | 100% ± 0 | 90% | 52% |
| Degree 4 Ontology | 100% ± 0 | 100% ± 0 | 80% | 59% |
| Random Degree Ontology | 100% ± 0 | 100% ± 0 | 78% | 61% |
| Palladio's Villa | 100% ± 0 | 100% ± 0 | 87% | 56% |
| Piecewise model | 100% ± 0 | 100% ± 0 | 74% | 51% |

Evaluations with runtime over one hour omitted. Accuracy and Variability are necessary conditions. Repeatability is desired at 100% and conciseness, reported as a percentage ratio of induced rules to unique nodes, has theoretical asymptote near 50%. Bounds represent the first quantile of runs.

As a necessary condition of any grammar to be selected was that it would achieve accuracy and variability, all evaluations reported achieved those goals.

Repeatability varied over the course of experimental cycles (Table 4). In the trial data cases, it varied proportionally to connectedness with higher dimensionality leading to significantly fewer repeatable grammars. This is likely because selecting for concise grammars may sometimes lead to certain grammar features being represented more than once. It can be very difficult to determine the difference between two grammars for the same data set. For the random degree case, this is not a problem for small examples, but for larger cases this might mean that it becomes almost impossible to rely on only searching for unique rules over all resulting grammars when the algorithm is run.

Conciseness performed best on one dimensional cases but showed significantly less favorable results in more complex evaluations. This is attributable to the number of plausible and actual node connected pairs increasing significantly with more dimensionality. As a result, however, it means that the inducted grammars are too large to be useful and are likely to include many rules that are near duplicates of each other. Removing these is nontrivial and would make the current approach take orders of magnitude longer to compute. This said, efficient rule reduction occurred in many cases. For example, FIG. 9 shows an example from a sample random degree ontology evaluation in which the induced grammar is shorter and simpler than the input grammar, while retaining key high complexity rules, and adding providing multifunction rule alternatives.

As described above, in FIG. 9, the input grammar was used to construct a graph that was then induced to produce a grammar that was 25% shorter while retaining key structural rules.

The Palladio's Villa grammar also demonstrates these results. The induced grammar is able to almost perfectly express its source data and fail only where aspects of the source data were not fully induced. For example the columns at the front of the house as well as the entry way stairs were not properly resolved because rules for those features had no ontological waypoints. This would not be the case if the grammar was created with visual data included but as previously mentioned, the intention was to build an ontological grammar from this data which was done successfully.

The piecewise model was also inducted very successfully and this example provides a context for demonstrating how efficient a grammar can become when it is induced over a purely ontological model of a dataset, even if that data is 3D in nature. For example, rules extracted for this approach saw either very high repeated use or they implemented unique features. This shows that the induction process was able to build representative chunks that encompassed much of the inherent variability of details of the model.

Figure 12:
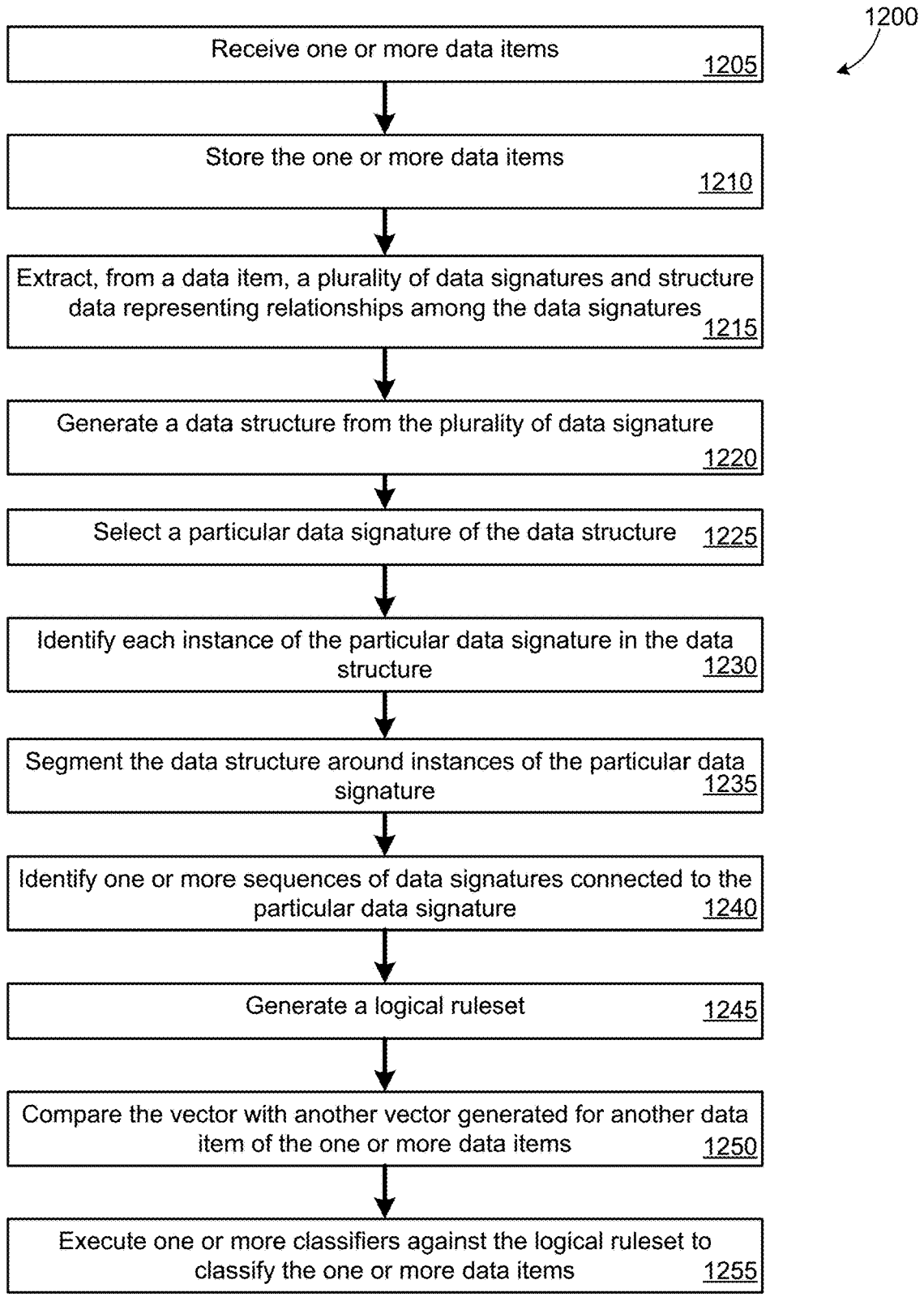
FIG. 12 is a flow diagram showing a process for preprocessing data for a machine learning classifier.

A process for pre-processing data for a machine learning classifier is shown in FIG. 12. The data processing system 100 receives (1205) one or more data items. The data processing system 100 stores (1210) the one or more data items, with each of the one or more data items being written to the shared memory data store. The data processing system 100 extracts (1215), from a data item of the one or more data items written to the shared memory data store, a plurality of data signatures and structure data representing relationships among the data signatures. The data processing system 100 generates (1220) a data structure from the plurality of data signatures, wherein the data structure includes a plurality of nodes connected with edges, each node in the data structure represents a data signature, and wherein each edge specifies a relationship between a first node and a second node, with the specified relationship corresponding to a relationship represented in the structure data for data signatures represented by those first and second nodes. The data processing system 100 selects (1225) a particular data signature of the data structure. In some implementations, the data processing system 100 ranks the plurality of data signatures, and selects a higher ranked data signature to be the particular data signature. The data processing system 100, for the particular data signature of the data structure that is selected, identifies (1230) each instance of the particular data signature in the data structure, segments (1235) the data structure around instances of the particular data signature, and identifies (1240), based on the segmenting, one or more sequences of data signatures connected to the particular data signature, each of the one or more sequences being different from one or more other identified sequences of data signatures connected to the particular data signature in the data structure. In some implementations, the data processing system 100 receives data indicating a threshold number of sequences, determines that a number of identified sequences for the data signature exceeds the threshold number of sequences, segments the data signature into sub-data signatures that each comprise at least one feature of the data signature, and generates another logical ruleset for at least one of the sub-data signatures, the other logical ruleset replacing the logical ruleset for the data signature. The data processing system 100 generates (1245) a logical ruleset, wherein each logical rule of the logical ruleset is defined by a sequence of data signatures of the one or more sequences of data signatures that are identified. In some implementations, the data processing system 100 determines which logical rules of the logical ruleset occur in another data item of the one or more data items, represents the other data item as a vector of the logical rules that occur in the other data item. In some implementations, the data processing system 100 determines, for a logical rule, a frequency for which a sequence that defines the logical rule appears in the data structure, determines that the frequency is less than a threshold frequency, and removes the logical rule from the logical ruleset.

In some implementations, the data processing system 100 determines that at least two sequences of the plurality are within a threshold similarity to one another, and combines at least two logical rules of the logical rule set, each of the least two logical rules corresponding to one of the at least two sequences of the plurality. In some implementations, the data processing system 100 determines that a first sequence of a plurality of sequences includes a second sequence of the plurality of sequences, and removes, from the logical ruleset, a logical rule defined by the first sequence. The data processing system 100 compares (1250) the vector with another vector generated for another data item of the one or more data items, wherein comparing includes computing a distance between the vector and the other vector in a vector space. The data processing system 100 executes (1255) one or more classifiers against the logical ruleset to classify the one or more data items received by the input port, wherein one or more additional logical rules for the logical ruleset are generated based on the executing.

This work has introduced a method for classifying ontologies through efficiently inducing grammars using uncoded data. The grammar induction aspects of the method were validated with experiments establishing the accuracy, variability, repeatability and conciseness of produced grammars, with several types of data.

The difficulty of computing grammars used for design has made them relatively uncommon in industry. Facilitating their efficient use with this new automated approach may rekindle the formal assessment of shape in design outside of the academic community. Furthermore, the academic advantages of having fast ways to generate grammars for a broad array of types of data opens the field to new grammar based endeavors. Fast and accurate machine translation remains a focus of many researchers in computer science and linguistics; incorporating more lessons from their approaches, as well as considering other ways in which automated grammar approaches can be developed and applied are directions of deep interest to us moving forward.

As used herein, the terms "computer" and "computer systems" refer broadly to any sort of combination of one or more servers and/or computing devices. As used herein, the terms "instrument(s)" and "electronic instrument(s)" refer broadly to any type of device and/or document (or any combination thereof), which presents data and/or information to a user and allows the user to input and/or send data and/or information to the system.

Embodiments can be implemented in digital electronic circuitry, in computer hardware, firmware, software, or in combinations thereof. An apparatus can be implemented in a computer program product tangibly embodied or stored in a machine-readable storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 10/8/7/200 etc., Windows NT, Sun, Linux, and Macintosh may also be used. Computer users can view information available on servers or networks on the Web using browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments of the invention have been described. Nevertheless, it will be understood that various modifications may be made without departing from the spirit and scope of the invention. Accordingly, other embodiments are within the scope of the following claims.

What is claimed is:

1. A data processing system configured to pre-process data for a machine learning classifier, the data processing system comprising:
    an input port that receives one or more data items;
    a shared memory data store that stores the one or more data items, with each of the one or more data items being written to the shared memory data store; and
    at least one processor configured to perform operations comprising:
        extracting, from a data item of the one or more data items written to the shared memory data store, a plurality of data signatures and structure data representing relationships among the data signatures, wherein a type of the data signatures is based on a domain of the one or more data items;
        generating, based on the type of the data signatures, a data structure from the plurality of data signatures, wherein the data structure includes a plurality of nodes connected with edges, each node in the data structure represents a data signature, and wherein each edge specifies a relationship between a first node and a second node, with the specified relationship corresponding to a relationship represented in the structure data for data signatures represented by those first and second nodes;
        selecting a particular data signature of the data structure;
        for the particular data signature of the data structure that is selected,
            identifying each instance of the particular data signature in the data structure;
            segmenting, based on the type of the data signatures, the data structure around instances of the particular data signature; and
            identifying, based on the segmenting, one or more sequences of data signatures connected to the particular data signature, each of the one or more sequences being different from one or more other identified sequences of data signatures connected to the particular data signature in the data structure, each of the one or more sequences including a connected set of data signatures in the data structure that are connected to the particular data signature, wherein each connection represents a relationship between a first data signature and a second data signature of the set of data signatures;
        generating, based on the type of the data signatures and independent of precoding any sequence of data signatures into a rule, a logical ruleset, wherein each logical rule of the logical ruleset is defined by a sequence of data signatures of the one or more sequences of data signatures that are identified, and wherein a logical rule of the logical ruleset comprises a shape rule specifying one or a sequence of more shapes that are either permitted to be adjacent in the sequence of data signatures, restricted from being adjacent in the sequence of data signatures, or replacing one or more prior shapes of the sequence of data signatures;
        executing one or more classifiers against the logical ruleset to classify the one or more data items received by the input port; and
        generating, based on the executing, one or more additional logical rules for the logical ruleset, the one or more additional logical rules specifying an additional relationship between at least two shapes of the plurality of shapes.

2. The data processing system of claim 1, wherein generation of the logical ruleset enables classification of the one or more data items with a reduced amount of data, relative to an amount of data required to classify the one or more data items independent of the generation of the logical ruleset.

3. The data processing system of claim 2, wherein classification of the one or more data items with a reduced amount of data increases a processing speed of the data processing system in classifying the one or more data items, relative to a processing speed of the data processing system in classifying the one or more data items independent of the generation of the logical ruleset.

4. The data processing system of claim 1, the operations further comprising:
    determining a frequency for which each logical rule of the logical ruleset appears in the data structure; and
    generating a vector representing the data item, the vector defined by the frequency for each logical rule of the logical ruleset.

5. The data processing system of claim 4, the operations further comprising:
    comparing the vector with another vector generated for another data item of the one or more data items, wherein comparing includes computing a distance between the vector and the other vector in a vector space.

6. The data processing system of claim 1, the operations further comprising:
    determining which logical rules of the logical ruleset occur in another data item of the one or more data items; and
    representing the other data item as a vector of the logical rules that occur in the other data item.

7. The data processing system of claim 1, the operations further comprising:
    ranking the plurality of data signatures; and
    selecting a higher ranked data signature to be the particular data signature, the higher ranked data signature being ranked higher than another data signature that is lower ranked.

8. The data processing system of claim 7, wherein data signatures above a threshold ranking are iteratively selected to be the particular data signature, and wherein the logical ruleset comprises logical rules generated for each of the data signatures selected to be the particular data signature.

9. The data processing system of claim 7, wherein the ranking for a data signature is proportional to a frequency in which that data signature appears in the plurality of data signatures.

10. The data processing system of claim 7, the operations further comprising: weighting a data signature with a predetermined weight value, and wherein ranking is based on the predetermined weight value of the data signature.

11. The data processing system of claim 1, the operations further comprising:
   determining, for a logical rule, a frequency for which a sequence that defines the logical rule appears in the data structure;
   determining that that frequency is less than a threshold frequency; and
   removing the logical rule from the logical ruleset.

12. The data processing system of claim 1, wherein the one or more sequences comprise a plurality of sequences, and the operations further comprising:
   determining that a first sequence of the plurality of sequences includes a second sequence of the plurality of sequences; and
   removing, from the logical ruleset, a logical rule defined by the first sequence.

13. The data processing system of claim 1, the operations further comprising:
   comparing a portion of the data item to a library of specified data signatures, and wherein a data signature is extracted from the data item when the portion of the data item matches a specified data signature of the library.

14. The data processing system of claim 13, wherein a specified data signature of the library is assigned one or more parameter values, and wherein the operations further comprise extracting the data signature from the data item when the portion of the data item satisfies the one or more parameter values assigned to the data signature, wherein the data item satisfies the one or more parameter values assigned to the data signature when the data item is within a threshold of the one or more parameter values in accordance with fuzzy matching.

15. The data processing system of claim 1, the operations further comprising:
   receiving data indicating a threshold number of sequences;
   determining that a number of identified sequences for the data signature exceeds the threshold number of sequences;
   segmenting the data signature into sub-data signatures that each comprise at least one feature of the data signature; and
   generating another logical ruleset for at least one of the sub-data signatures, the other logical ruleset replacing the logical ruleset for the data signature.

16. The data processing system of claim 1, wherein the one or more sequences comprise a plurality of sequences, the operations further comprising:
   determining that at least two sequences of the plurality are within a threshold similarity to one another; and
   combining at least two logical rules of the logical rule set, each of the at least two logical rules corresponding to one of the at least two sequences of the plurality.

17. The data processing system of claim 1, wherein the data item comprises a graph, wherein extracting comprises performing a traversal of the graph, and wherein a logical rule of the logical ruleset comprises a graph rule of the graph.

18. The data processing system of claim 5, wherein the other vector in the vector space is representative of a particular data item comprising a specified classification.

19. The data processing system of claim 5, wherein the other vector represents an average of a plurality of vectors that are generated.

20. The data processing system of claim 1, wherein the data item comprises an image, wherein extracting comprises performing an image processing process on the image, and wherein at least one of the plurality of data signatures comprises a visual feature of the image.

21. The data processing system of claim 1, wherein the data item comprises text, wherein at least one of the plurality of data signatures comprises a word of the text, and wherein the structure data comprises one or more of a word order and word distance between two words of the text.

22. The data processing system of claim 1, wherein the data item comprises a social graph, wherein a data signature of the plurality comprises a node of the social graph, and wherein the structure data comprises one or more edges of the social graph.

23. The data processing system of claim 1, wherein the data item comprises a schematic, wherein a data signature comprises a machine part, and wherein the structure data comprises enumerated relationships between the machine parts.

24. A data processing system configured to pre-process data for a machine learning classifier, the data processing system comprising:
   an input port that receives one or more radiological images;
   a shared memory data store that stores the one or more radiological images, with each of the one or more radiological images being written to the shared memory data store; and
   at least one processor configured to perform operations comprising:
      extracting image data representing a biological structure by image processing one of the one or more radiological images;
      identifying one or more portions of the biological structure each having a biological signature based on comparing the biological structure to a library of specified biological signatures, wherein a given biological signature is identified based on a fuzzy matching of features of the biological structure to features of the specified biological signatures;
      generating a data structure from the biological structure, wherein the data structure includes a plurality of nodes connected with edges, each node in the data structure represents one of the biological signatures, and wherein each edge specifies a relationship between a first node and a second node;
      selecting a particular biological signature of the biological structure in the data structure;
      for the particular biological signature that is selected, identifying each instance of the particular biological signature in the data structure;
      segmenting the data structure around instances of the particular biological signature; and
      identifying, based on the segmenting, one or more sequences of biological signatures connected to the particular biological signature in the data structure, each of the one or more sequences identified being different from other identified sequences of biological signatures connected to the particular biological signature in the data structure, each of the one or more sequences including a connected set of biological data signatures in the data structure that are connected to the particular biological data signature, wherein each connection represents a relationship between a first biological data signature and a second biological data signature of the set of data signatures;

generating, independent of precoding any sequence of biological data signatures into a rule, a logical ruleset, wherein each logical rule of the logical ruleset is a sequence of biological signatures of the one or more sequences of biological signatures that are identified, and wherein a logical rule of the logical ruleset comprises a shape rule specifying one or a sequence of more shapes that are either permitted to be adjacent in the sequence of data signatures, restricted from being adjacent in the sequence of data signatures, or replacing one or more prior shapes of the sequence of data signatures;

executing one or more classifiers against the logical ruleset to classify the one or more radiological images received by the input port; and generating, based on the executing, one or more additional logical rules for the logical ruleset, the one or more additional logical rules specifying an additional relationship between at least two shapes of the plurality of shapes.

25. The data processing system of claim 24, the operations further comprising:
   determining a frequency for which each logical rule of the logical ruleset appears in the data structure; and
   generating a vector representing the radiological image, the vector defined by the frequency for each logical rule of the logical ruleset.

26. The data processing system of claim 25, the operations further comprising:
   comparing the vector with another vector generated for another radiological image of the one or more radiological images, wherein comparing includes computing a distance between the vector and the other vector in a vector space; and
   determining whether the vector is indicative of one or more biological anomalies based on executing the one or more classifiers to classify the one or more radiological images received by the input port.

27. The data processing system of claim 24, wherein the biological structure comprises a vascular structure, and wherein the biological signature comprises one or more of a fork, a bend, and a loop in the vascular structure.

28. The data processing system of claim 24, wherein the biological structure comprises one of a tissue configuration, a nervous system, or a bone structure.

29. The data processing system of claim 26, wherein the other vector represents a radiological image indicative of a disease, and where determining whether the vector is indicative of the one or more biological anomalies comprises diagnosing the disease based on the comparing.

* * * * *

UNITED STATES PATENT AND TRADEMARK OFFICE
CERTIFICATE OF CORRECTION

PATENT NO. : 11,899,669 B2
APPLICATION NO. : 15/926790
DATED : February 13, 2024
INVENTOR(S) : Jonathan Cagan, Phil LeDuc and Mark Whiting Page 1 of 1

It is certified that error appears in the above-identified patent and that said Letters Patent is hereby corrected as shown below:

In the Specification

Column 1, Line 12 add:
--GOVERNMENT SUPPORT CLAUSE
This invention was made with United States government support under CMMI1233864, and CMMI1160840 awarded by the National Science Foundation. The U.S. government has certain rights in the invention.--

Signed and Sealed this
Twenty-eighth Day of January, 2025

Coke Morgan Stewart
*Acting Director of the United States Patent and Trademark Office*